(12) United States Patent
Shigemura

(10) Patent No.: US 10,780,858 B2
(45) Date of Patent: Sep. 22, 2020

(54) AIRBAG DEVICE

(71) Applicant: TOYODA GOSEI CO., LTD., Kiyosu-shi, Aichi-ken (JP)

(72) Inventor: Takashi Shigemura, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 174 days.

(21) Appl. No.: 15/913,974

(22) Filed: Mar. 7, 2018

(65) Prior Publication Data
US 2018/0281734 A1 Oct. 4, 2018

(30) Foreign Application Priority Data

Mar. 30, 2017 (JP) .................................. 2017-68789

(51) Int. Cl.
*B60R 21/217* (2011.01)
*B60R 21/206* (2011.01)
*B60R 21/00* (2006.01)

(52) U.S. Cl.
CPC ........ *B60R 21/2171* (2013.01); *B60R 21/206* (2013.01); *B60R 2021/0051* (2013.01)

(58) Field of Classification Search
CPC . B60R 21/206; B60R 21/217; B60R 21/2171; B60R 21/261; B60R 2021/0051
See application file for complete search history.

(56) References Cited

U.S. PATENT DOCUMENTS

| 5,558,362 A * | 9/1996 | Acker | B60R 21/2171 |
| | | | 280/728.2 |
| 5,611,563 A * | 3/1997 | Olson | B60R 21/2171 |
| | | | 280/728.2 |
| 2003/0141705 A1* | 7/2003 | Oka | B60R 21/2176 |
| | | | 280/728.2 |
| 2004/0090049 A1* | 5/2004 | McCann | B60R 21/2171 |
| | | | 280/728.2 |

(Continued)

FOREIGN PATENT DOCUMENTS

| JP | 3039217 U | 7/1997 |
| JP | 2003-220924 A | 8/2003 |

OTHER PUBLICATIONS

Office Action dated Mar. 13, 2020 issued in corresponding JP patent application No. 2017-068789 (and English translation).

*Primary Examiner* — Frank B Vanaman
(74) *Attorney, Agent, or Firm* — Posz Law Group, PLC

(57) ABSTRACT

An airbag device includes an airbag, an inflator and a retainer. The retainer includes a generally tubular holding section for holding the inflator therein and mounting means which protrudes out of the holding section in a direction generally perpendicular to an axis of the inflator to be mounted on a vehicle body member in order to mount the airbag and the inflator on the vehicle body member. The holding section includes an elastically deformable support region which has been elastically deformed and brought into abutment against an outer circumference of the inflator when the inflator was inserted into the holding section, and sup- (Continued)

ports the inflator in the elastically deformed state at an inner side of the holding section, and a supporting projection which has higher rigidity than the elastically deformable support region and abuts against the outer circumference of the inflator at the inner side of the holding section.

11 Claims, 23 Drawing Sheets

(56) References Cited

U.S. PATENT DOCUMENTS

| | | | |
|---|---|---|---|
| 2007/0182132 A1* | 8/2007 | Wright | B60R 21/2171 280/728.2 |
| 2011/0163522 A1* | 7/2011 | Hamels | B60R 21/2171 280/728.2 |

* cited by examiner

F I G . 4
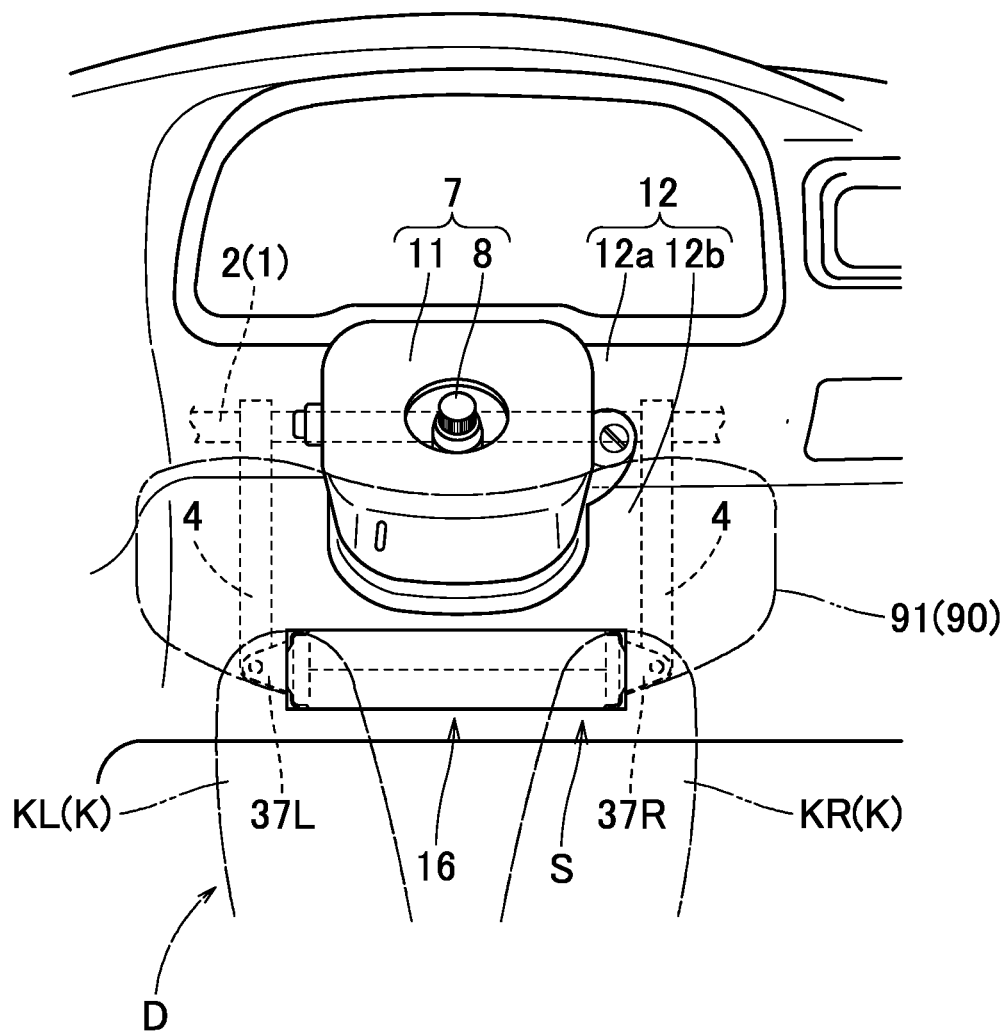

F I G . 18
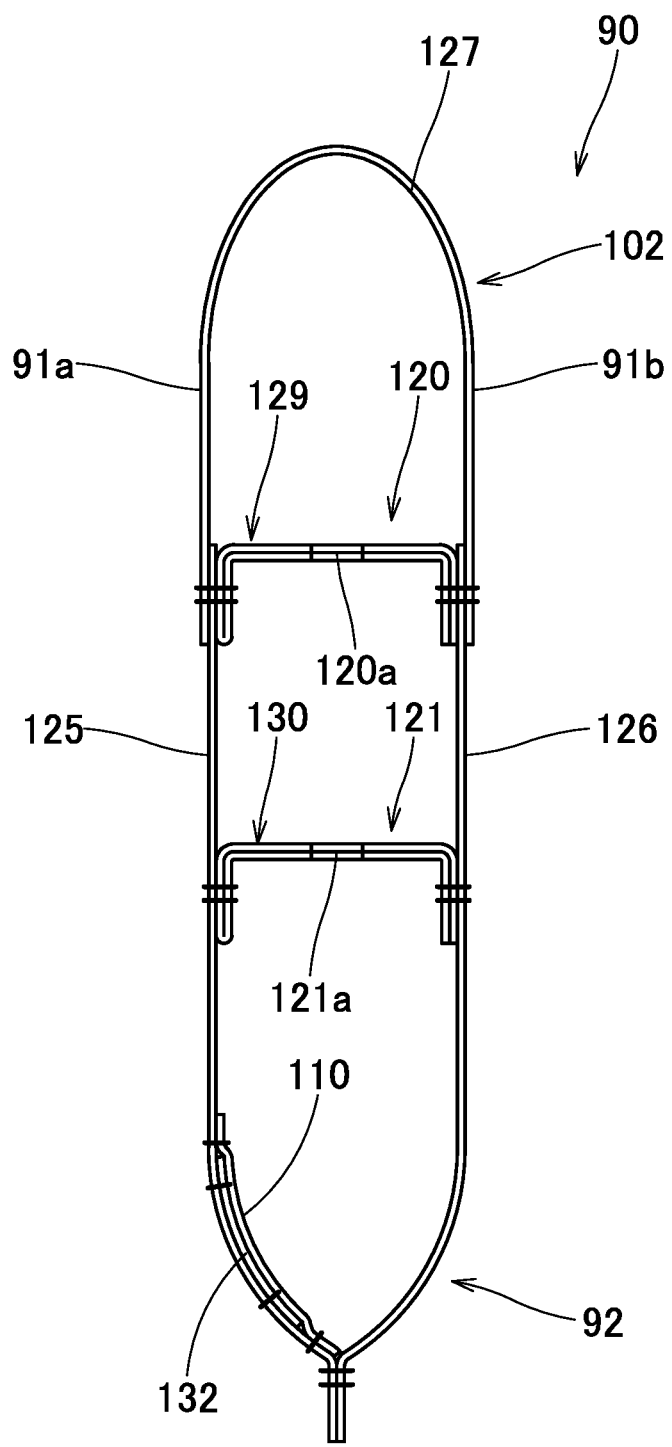

FIG. 21
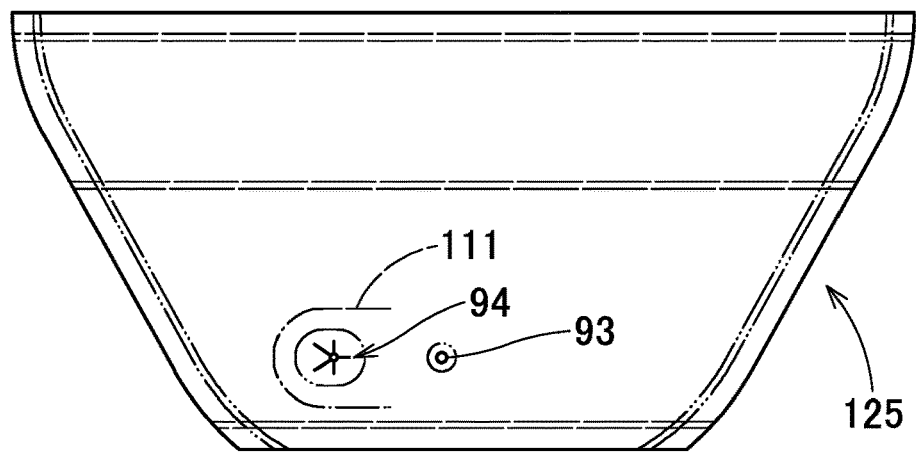
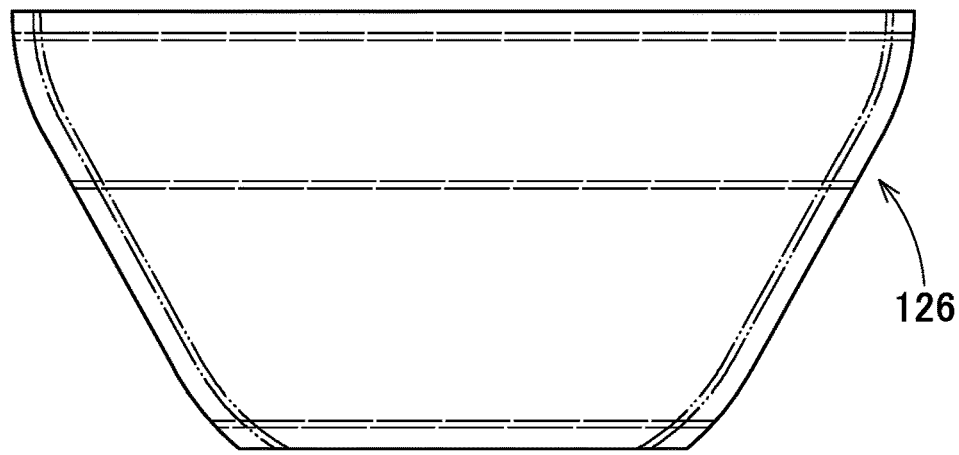

AIRBAG DEVICE

CROSS REFERENCE TO RELATED APPLICATIONS

The present application claims priority from Japanese Patent Application No. 2017-068789 of Shigemura, filed on Mar. 30, 2017, the entire disclosure of which is incorporated herein by reference.

BACKGROUND OF THE INVENTION

1. Field of the Invention

The present invention relates to an airbag device which includes an airbag, an inflator for feeding the airbag with an inflation gas, and a retainer used to mount the airbag and inflator on the vehicle body structure.

2. Description of Related Art

Japanese Registered Utility Model No. 3039217 discloses a known airbag device which includes an airbag, a generally cylindrical inflator for feeding the airbag with an inflation gas, and a retainer which holds the inflator and mounts the airbag and inflator on a vehicle body member through the use of mounting means. The retainer includes a generally tubular holding section for receiving and holding the inflator therein. In order to hold the inflator therein, the holding section is provided with a supporting region which has rigidity and protrudes inwardly for abutment against the inflator.

More specifically, in the above-mentioned conventional airbag device, the supporting region is formed at two positions spaced apart in an axial direction of the holding section, and each of the supporting region is composed of a pair of supporting projections which are disposed at diametrically opposed positions. The inflator is supported only with the gripping engagement by the supporting regions. Such supporting projections must not be protruding too much in the light of ease of insertion of the inflator into the retainer. On the contrary, an insufficient protruding amount of the projections will be likely to adversely affect the supporting property of the retainer. It would therefore be desirable to provide an airbag device that has ease of insertion of an inflator into a retainer and would assure sufficient support of the inflator by the retainer as well.

SUMMARY OF THE INVENTION

An object of the present invention is to provide an airbag device for a vehicle that has ease of assembling of an inflator with a retainer and assures sufficient support of the inflator by the retainer.

The airbag device of the invention includes an airbag that is inflatable with an inflation gas, an inflator that feeds the airbag with the inflation gas, and a retainer that holds the inflator and mounts the airbag and the inflator on a vehicle body member.

The inflator is generally cylindrical in outer contour.

The retainer includes a holding section that is generally tubular in outer contour for receiving and holding the inflator therein, and mounting means that protrudes out of the holding section in a direction generally perpendicular to an axis of the inflator and is adapted to be mounted on the vehicle body member in order to mount the airbag and the inflator on the vehicle body member.

The holding section of the retainer includes, at the inner side, an elastically deformable support region and a supporting projection for supporting the inflator. The elastically deformable support region is configured to elastically deform and be brought into abutment against an outer circumference of the inflator when the inflator is inserted into the holding section, and supports the inflator in the elastically deformed state. The supporting projection has higher rigidity than the elastically deformable support region and abuts against the outer circumference of the inflator. The elastically deformable support region and supporting projection support the inflator at the inner side of the holding section.

With the airbag device of the invention, the inflator can be smoothly inserted into the holding section of the retainer due to elastic deformation of the elastically deformable support region when assembling the inflator with the retainer. After the inflator has been inserted, the elastically deformable support region abuts against the outer circumference of the inflator in the elastically deformed state. Further, the holding section includes the supporting projection which has higher rigidity than the elastically deformable support region and abuts against the outer circumference of the inflator. Accordingly, after the inflator has been once inserted into the holding section, the elastically deformable support region and the supporting projection support the inflator adequately at desired positions inside the holding section.

Therefore, the airbag device of the invention provides ease of assembling of the inflator with the holding section of the retainer and assures adequate support of the inflator by the holding section of the retainer.

If either the elastically deformable support region or the supporting projection is disposed at two spaced-apart positions in an axial direction of the inflator, the holding section supports the inflator more stably at the two spaced-apart positions without a fear that the central axis of the inflator may incline with respect to that of the holding section.

Moreover, if the elastically deformable support region and the supporting projection are formed at three generally radial positions in total about the axis of the inflator, the outer circumference of the inflator will be supported in a balanced fashion at the three radial positions, and an axial center of the inflator and that of the holding section (i.e. the center that the holding section holds the inflator) will be matched easily at the insertion of the inflator.

If those elastically deformable support region and the supporting projections are disposed generally at the same position in the axial direction of the inflator, the elastically deformable support region and the supporting projections will support the outer circumference of the inflator at three points around the axis of the inflator at one position in the axial direction of the inflator. Therefore, the holding section is capable of holding the inflator further stably.

In the airbag device of the invention, it is desired to form the holding section of a sheet metal and to form the elastically deformable support region by cutting and raising a portion of the holding section. With this configuration, the elastically deformable support region can be formed at the same time as the manufacture of the retainer. This configuration will also contribute to reduction of the number of parts and manufacturing cost of the airbag device.

In this instance, if the cutting and raising provides an opening in the periphery of the elastically deformable support region on the holding section, it will be desired to close the opening in order to prevent an inflation gas exiting the inflator from flowing out of the retainer via the periphery of the elastically deformable support region.

BRIEF DESCRIPTION OF DRAWINGS

FIG. 4 is a schematic front view of the airbag device of FIG. 1 as actuated, viewed from the rear;

FIG. 18 is an enlarged sectional view of the airbag of FIG. 17 taken along line XVIII-XVIII;

FIGS. 21 and 22 depict base materials of the airbag of FIG. 17 by plan views;

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
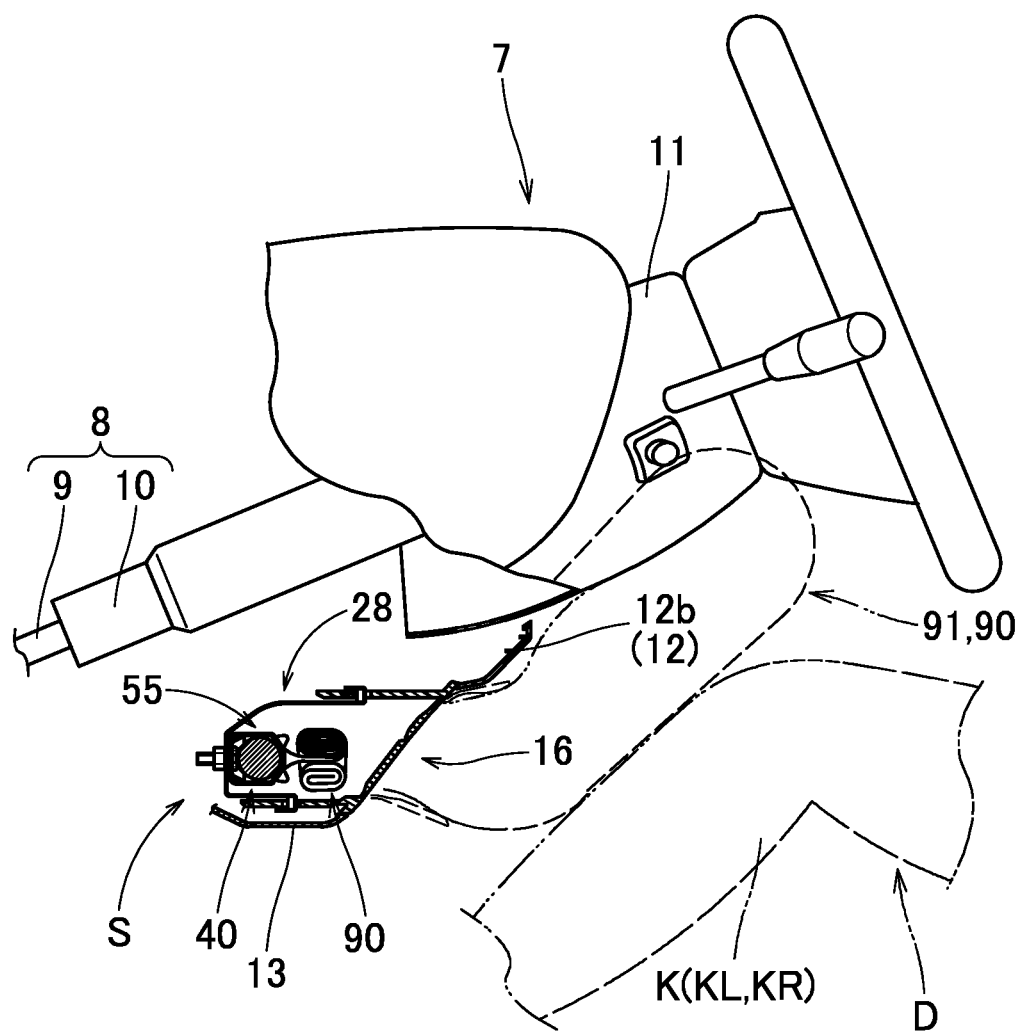
FIG. 1 is a schematic vertical sectional view of a knee-protecting airbag device embodying the invention as mounted on a vehicle and actuated, taken along a front and rear direction of the vehicle.

As shown in FIGS. 1 and 4, an airbag device S embodying the invention is mounted beneath a steering column 7, in front of a driver's seat of a vehicle, as a knee-protecting airbag device for protecting knees K (KL and KR) of a driver (as an occupant) D. Unless otherwise specified, up/down, left/right and front/rear directions in this specification are intended to refer to up/down, left/right and front/rear directions of the airbag device S as mounted on the vehicle.

The steering column 7 includes a column body 8 and a column cover 11 which covers an outer circumference of the column body 8. As shown in FIG. 1, the column body 8 includes a main shaft 9 and a column tube 10 covering the main shaft 9.

Figure 2:
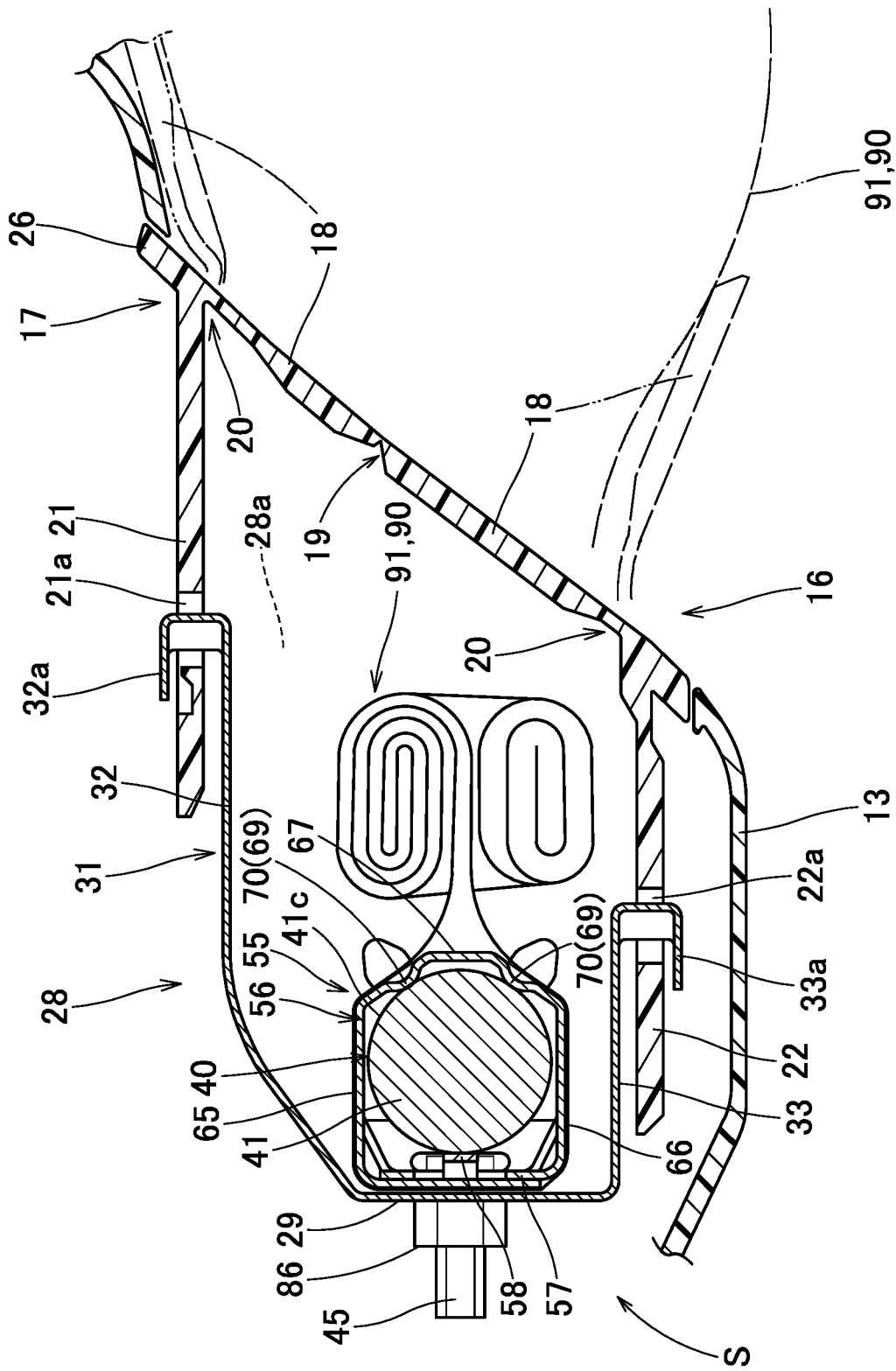
FIG. 2 is a schematic enlarged vertical sectional view of the airbag device of FIG. 1 taken along a front and rear direction of the vehicle.
Figure 3:
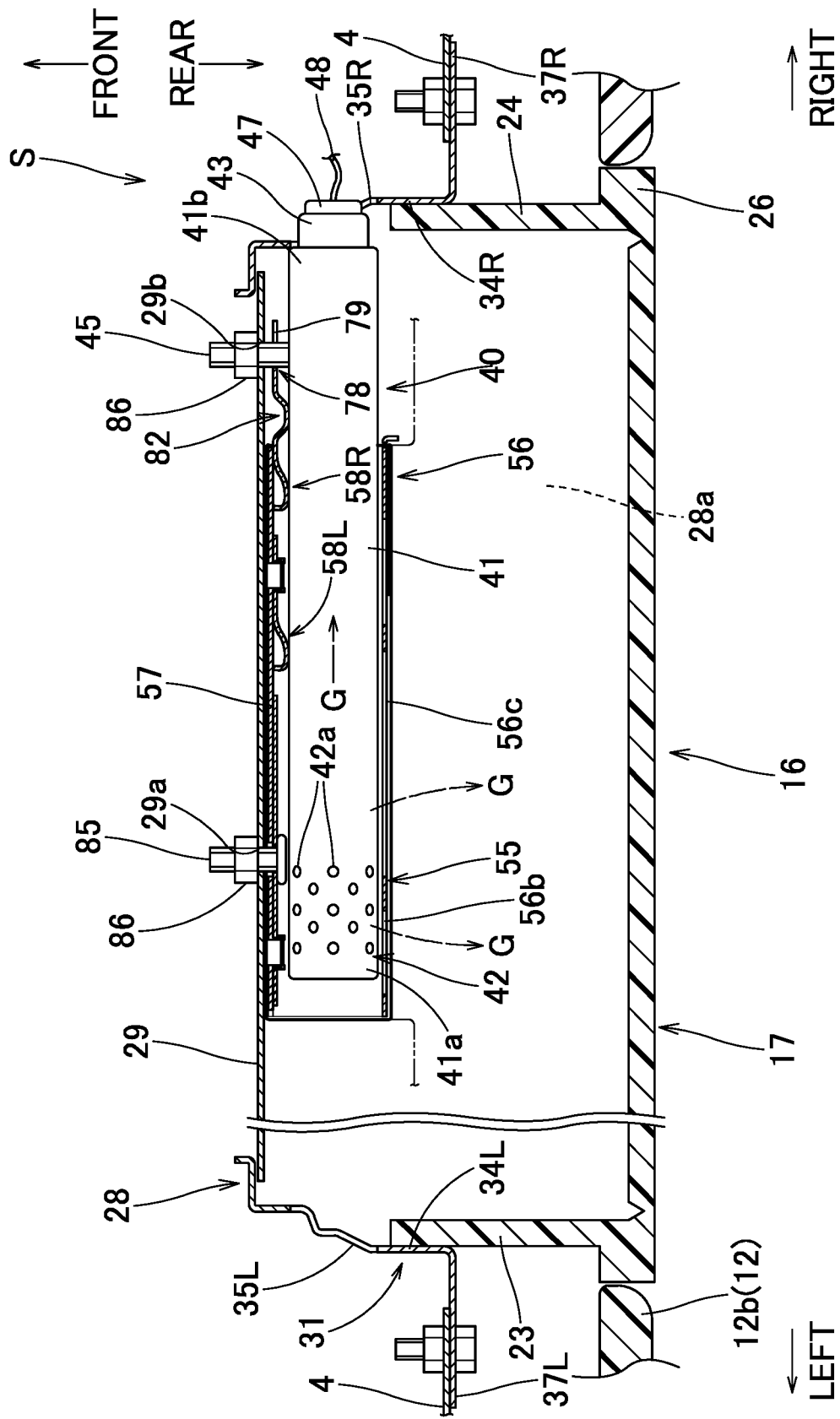
FIG. 3 is a schematic horizontal sectional view of the airbag device of FIG. 1 taken along a left and right direction.

As shown in FIGS. 1 to 3, the airbag device S includes an airbag 90, which is in a folded-up configuration, an inflator 40 for feeding the airbag 90 with an inflation gas, a case (vehicle body member) 28 for housing the airbag 90 and inflator 40, a retainer 55 which is used to mount the airbag 90 and inflator 40 on the case 28, and an airbag cover 16 for covering the rear side of the airbag 90.

The airbag cover 16 is fabricated of thermoplastic elastomer (TPO) and covers the rear side of the case 28. As shown in FIGS. 1 to 4, the airbag cover 16 is disposed in a lower panel 12b of an instrument panel or dashboard 12 which is composed of an upper panel 12a and lower panel 12b. The airbag cover 16 includes a door-forming region 17 which is disposed in a vicinity of a later-described emergence opening 28a of the case 28, and a peripheral region 26 disposed around the door-forming region 17. Referring to FIGS. 2 and 3, the door-forming region 17 includes a door 18, mounting regions 21 and 22 which extend forward from upper and lower end portions of the door 18 for joint with the case 28, and side walls 23 and 24 which extend forward from left and right end portions of the door 18. The door 18 is disposed at the rear of the emergence opening 28a and formed into a generally rectangular plate. In the illustrated embodiment, the door 18 is provided with a thinned breakable region 19 which is formed generally into H (FIG. 19) as viewed from the rear so as to be openable upward and downward about hinges 20 which are disposed at upper and lower ends of the door 18. Each of the mounting regions 21 and 22 extends forward so as to adjoin a later-described upper wall 32/lower wall 33 of the case 28 on the outside, and is provided, at the front end, with a plurality of rectangular retaining holes 21a/22a for engagement with later-described hooks 32a/33a of the case 28. The retaining holes 21a and 22a are formed along a left and right direction. The side walls 23 and 24 extend forward and adjoin later-described left wall 34L and right wall 34R of the case 28 on the inner side.

The peripheral region 26 of the airbag cover 16 is disposed around the door-forming region 17. As shown in FIGS. 2 and 3, the peripheral region 26 of the illustrated embodiment extends outwardly from the door 18 such that the rear surface is generally flush with the door 18.

Figure 5:
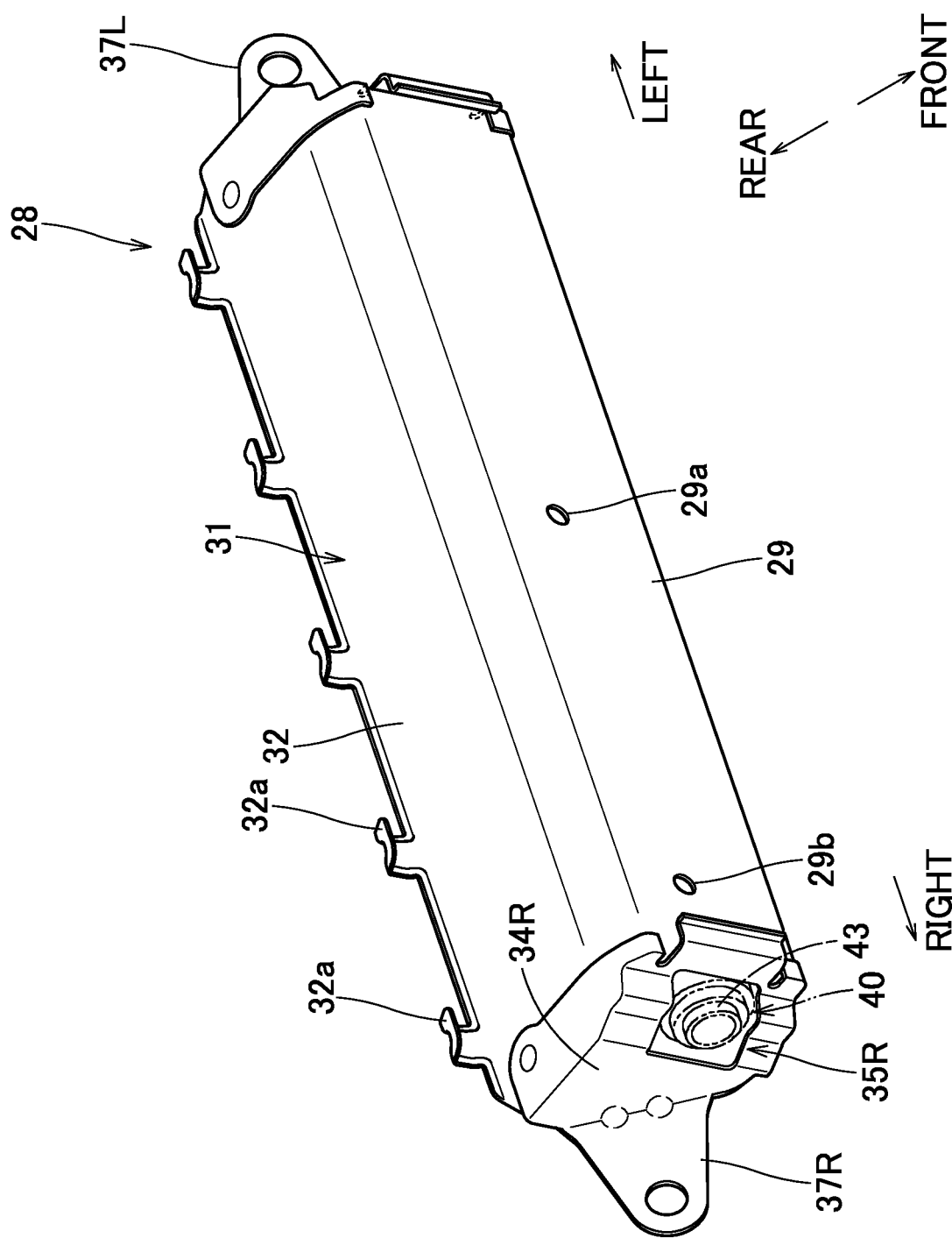
FIG. 5 is a perspective view of a case for use in the airbag device of FIG. 1, viewed from the front.

The case 28 is made of sheet metal. As shown in FIGS. 2, 3 and 5, the case 28 of the illustrated embodiment is formed generally into such a box that includes a generally square bottom wall 29, which is adapted to face forward as mounted on the vehicle, a generally square tubular circumferential wall 31 which extends rearward from a circumferential edge of the bottom wall 29, and an emergence opening 28a via which the airbag 90 emerges out of the case 28 for deployment.

The bottom wall 29 is formed into a generally rectangle elongated in a left and rear direction. The bottom wall 29 includes an aperture 29a for receiving a bolt (mounting means) 85 of the retainer 55 and an aperture 29b for receiving a bolt 45 of the inflator 40 at spaced-apart positions in a left and right direction. In the illustrated embodiment, the bottom wall 29 of the case 28 serves as a vehicle body member on which the inflator 40 and airbag 90 are mounted.

The circumferential wall 31 includes an upper wall 32 and a lower wall 33 which are opposed in an up and down direction and a left side wall 34L and a right side wall 34R which are opposed in a left and right direction. Each of the upper wall 32 and lower wall 33 is provided with a plurality of hooks 32a/33a for engagement with the peripheries of the retaining holes 21a/22a of the mounting regions 21/22 of the airbag cover 16. Each of the hooks 32a/33a protrudes outwardly and is so bent that the leading end faces towards the front, thus having a generally L shaped sectional shape. In the illustrated embodiment, the upper wall 32 and lower wall 33 are provided with five hooks 32a/33a each, lined up in a left and right direction.

In the illustrated embodiment, the left side wall 34L and right side wall 34R are formed into bilaterally symmetric contours. The right side wall 34R, as a representative of both, will be described in detail below.

The right side wall 34R has such a stepped contour that the front region, which adjoins the bottom wall 29, is disposed farther inward (or towards the left) than the rear region, which adjoins the emergence opening 28a. As shown in FIG. 5, the right side wall 34R is provided with a through opening 35R which is rectangular as viewed from the left or right side. The through opening 35R allows a later-described connection port 43 of the inflator 40 as set in the case 28 to be exposed for connection with a connector 47.

As shown in FIGS. 3 and 5, the case 28 of the illustrated embodiment further includes a pair of mounting sections 37L and 37R each of which extends outwardly in a left and right direction from the rear edge of the left side wall 34L/right side wall 34R. The mounting sections 37L and 37R are used to mount the case 28 on the vehicle body structure 1. The mounting sections 37L and 37R are jointed to brackets 4 extending from the dashboard reinforcement 2, part of the vehicle body 1, at the front side of the lower panel 12b of the dashboard 12.

As shown in FIG. 3, the inflator 40 of the illustrated embodiment includes a generally cylindrical body 41 and a bolt 45 which protrudes out of the body 41. The inflator body 41 is adapted to be disposed along a left and right direction of the vehicle, and includes a gas release section 42 at the left end 41a region (i.e. at the leading end region). As shown in FIG. 3, the gas release section 42 includes numerous gas discharge ports 42a which are arranged in a radially interspaced fashion, in more than one rows. At the right end (root end) 41b of the inflator body 41, there is provided a connection port 43 for joint with a connector 47 to which lead wires 48 are connected for feeding an actuating signal. The bolt 45 protrudes out of the right end 41b region of the inflator body 41 generally orthogonally to the axis of the inflator body 41. More specifically, the bolt 45 is disposed at an approximately one-fifth position of the length of the inflator body 41 from the end face of the right end 41b.

Figure 6:
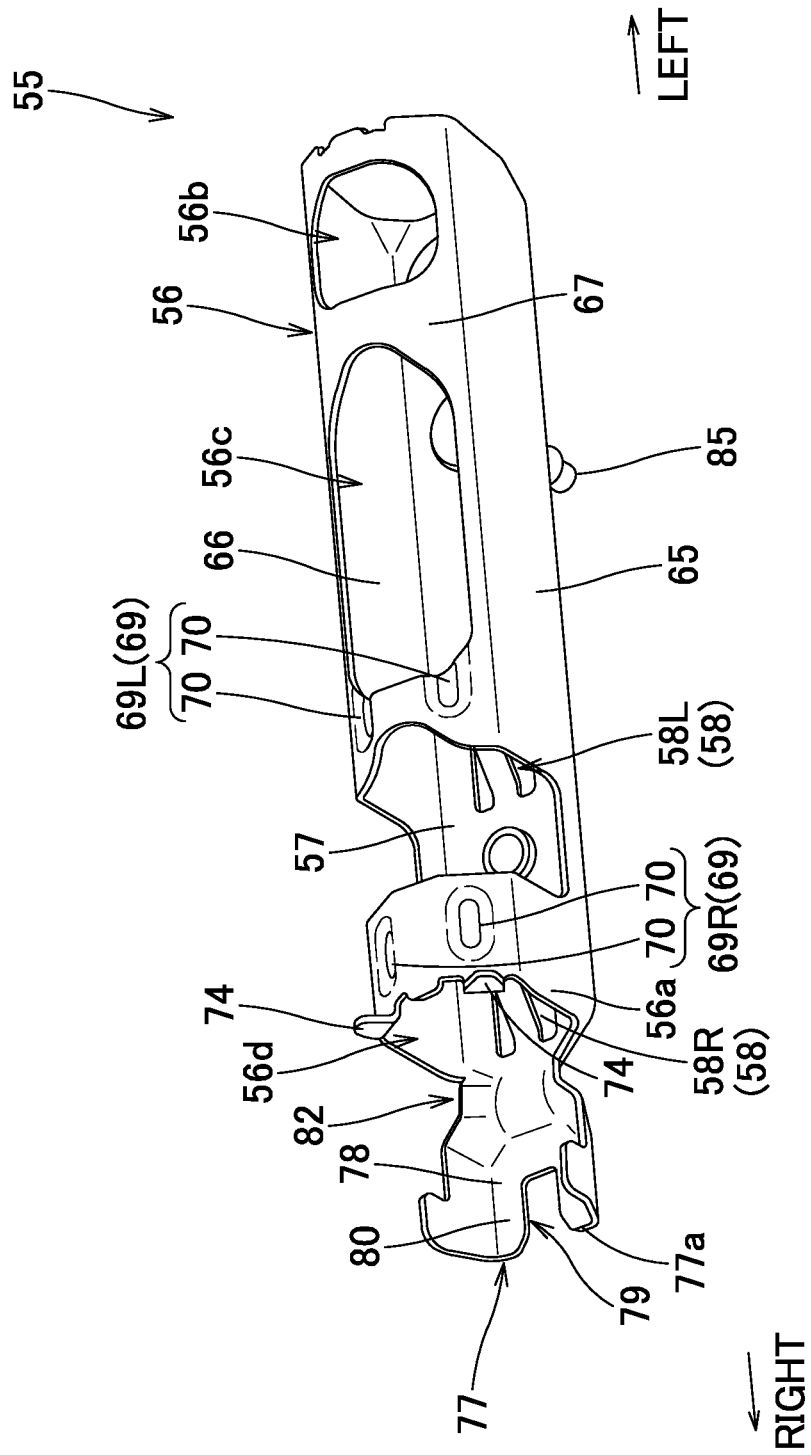
FIG. 6 is a perspective view of a retainer for use in the airbag device of FIG. 1, viewed from the rear.

Referring to FIG. 6, the retainer 55 includes a generally tubular holding section 56 which covers an outer circumference of the inflator 40 and supports the inflator 40, a bolt (mounting means) 85 which protrudes out of the holding section 56 generally orthogonally to the axis of the inflator 40, a storing cove section 78 for receiving the bolt 45 of the inflator body 41, and a pressing section 82 which is pressed onto the outer circumference of the inflator body 41 when mounted on board. In the illustrated embodiment, the members of the retainer 55 except the bolt 85 (i.e. the holding section 56, later-described extended region 77 for forming the storing cove section 78 and the pressing section 82) are integral and formed of a sheet metal.

Referring to FIGS. 6 to 11, the holding section 56 is formed into a generally square tubular contour elongated in a left and right direction, and are open at both left and right ends. The holding section 56 includes a bottom wall 57 which is disposed generally along the bottom wall 29 of the case 28, an upper wall 65 which extends rearward from a vicinity of the upper edge of the bottom wall 57 and covers the upper side of the inflator body 41, a lower wall 66 which extends rearward from a vicinity of the lower edge of the bottom wall 57 and covers the lower side of the inflator body 41, and a rear wall 67 which connects the rear ends of the upper wall 65 and lower wall 66 and covers the rear side of the inflator body 41. More particularly, the rear wall 67 includes, at the upper area and lower area, an upper sloping region 67a and a lower sloping region 67b which are formed in such a manner as to chamfer the corners of the holding section 56. The holding section 56 further includes an outlet opening 56b and an outlet opening 56c for releasing an inflation gas emitted out of the gas release section 42 of the inflator body 41 into the airbag 90. Each of the outlet openings 56b and 56c is formed by cutting out a portion of the holding section 56 which covers the rear side of the gas release section 42 of the inflator 40 (i.e. a portion of the rear wall 67). An opening formed at the right end 56a of the holding section 56 serves as an insert opening 56d via which the inflator body 41 is inserted from the gas release section 42.

Figure 11:
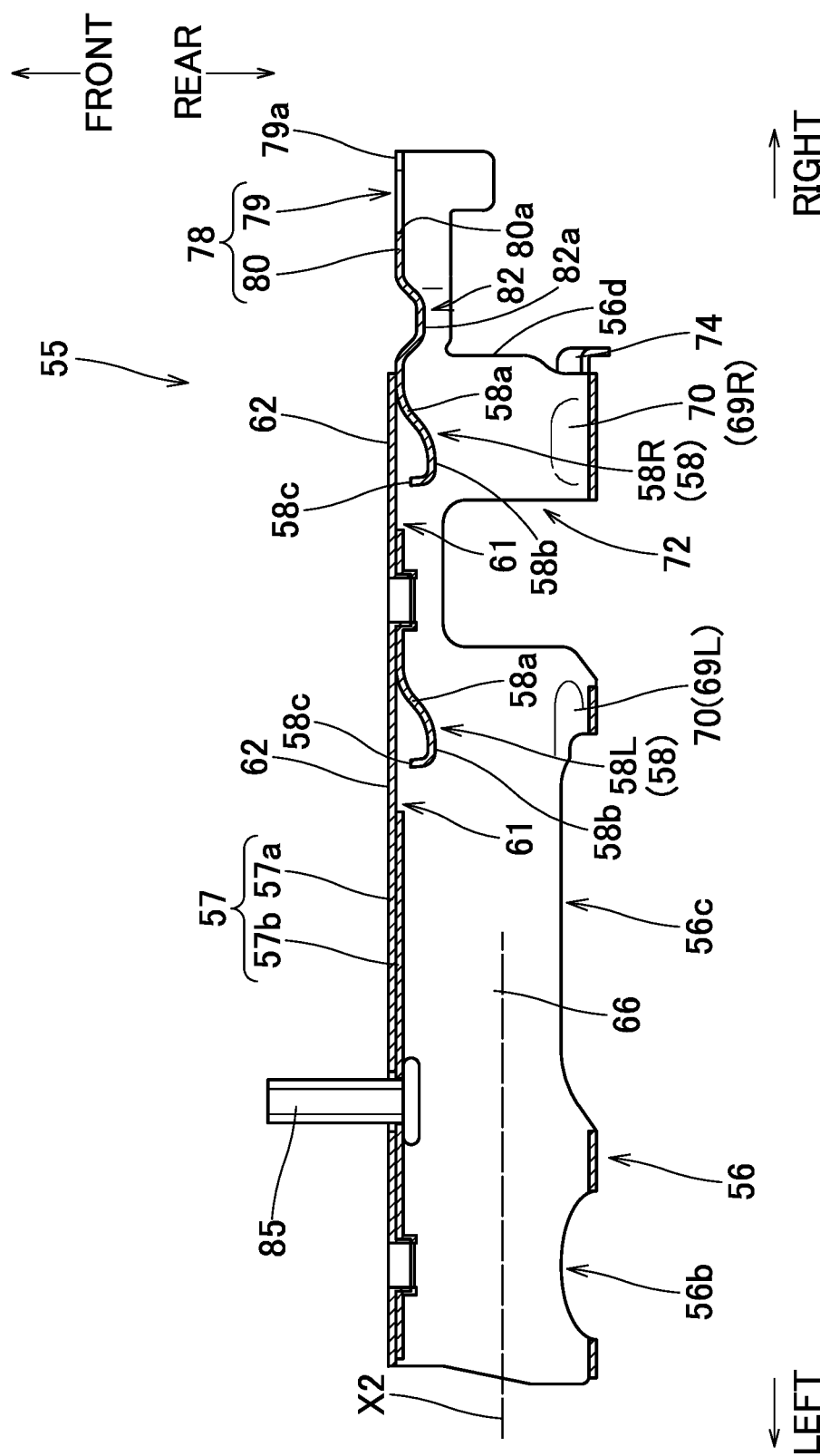
FIG. 11 is a sectional view of the retainer taken along line XI-XI of FIG. 7.
Figure 13:
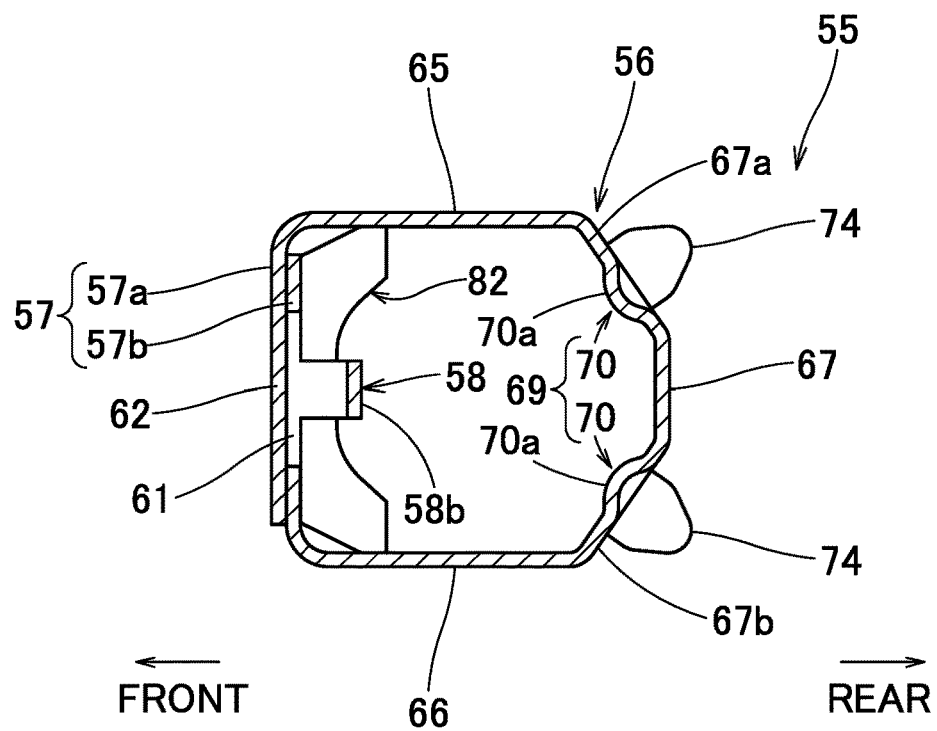
FIG. 13 is an enlarged sectional view of the retainer taken along line XIII-XIII of FIG. 7.

As shown in FIGS. 2 and 3, the bottom wall 57 is formed into a flat plate elongated in a left and right direction. In the illustrated embodiment, the members of the retainer 55 except the bolt 85 (i.e. the holding section 56, the extended region 77 for forming the storing cove section 78 and the pressing section 82) are formed of a sheet metal as described above. The sheet metal is formed into a predetermined shape by pressing or the like, and then the opposite edges of the sheet metal are lapped and jointed by suitable clinching technique at the bottom wall 57. Thus the bottom wall 57 has a double-wall structure of an outer region 57a and an inner region 57b, as shown in FIGS. 11 and 13.

Figure 10:
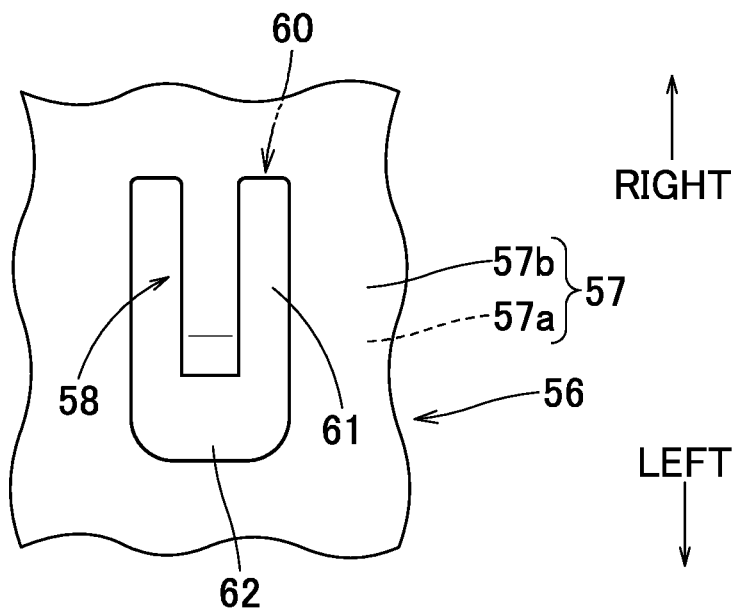
FIG. 10 is a partial enlarged view of an elastically deformable support region of the retainer of FIG. 6.

The bottom wall 57 includes an elastically deformable support region 58 which is to elastically deform when the inflator body 41 is inserted into the holding section 56 and abut against the outer circumference 41c of the inflator body 41. The elastically deformable support region 58 is formed into a band extending generally along a left and right direction. As shown in FIGS. 10 and 11, the right end (or root end) of the elastically deformable support region 58, which is closer to the insert opening 56d, is continuous with the bottom wall 57, while the leading end 58c is separated from the bottom wall 57. More specifically, the elastically deformable support region 58 extends obliquely inwardly (i.e. towards the rear, as mounted on board) towards the left, and is bent forward at the leading end 58c, thus having a J-like curved sectional shape. That is, the elastically deformable support region 58 includes a sloping region 58a, which is composed of the root region, the leading end region 58c and a support body 58b which is disposed between the sloping region 58a and the leading end region 58c and curved generally in an arcuate shape and protrudes inwardly.

Figure 14:
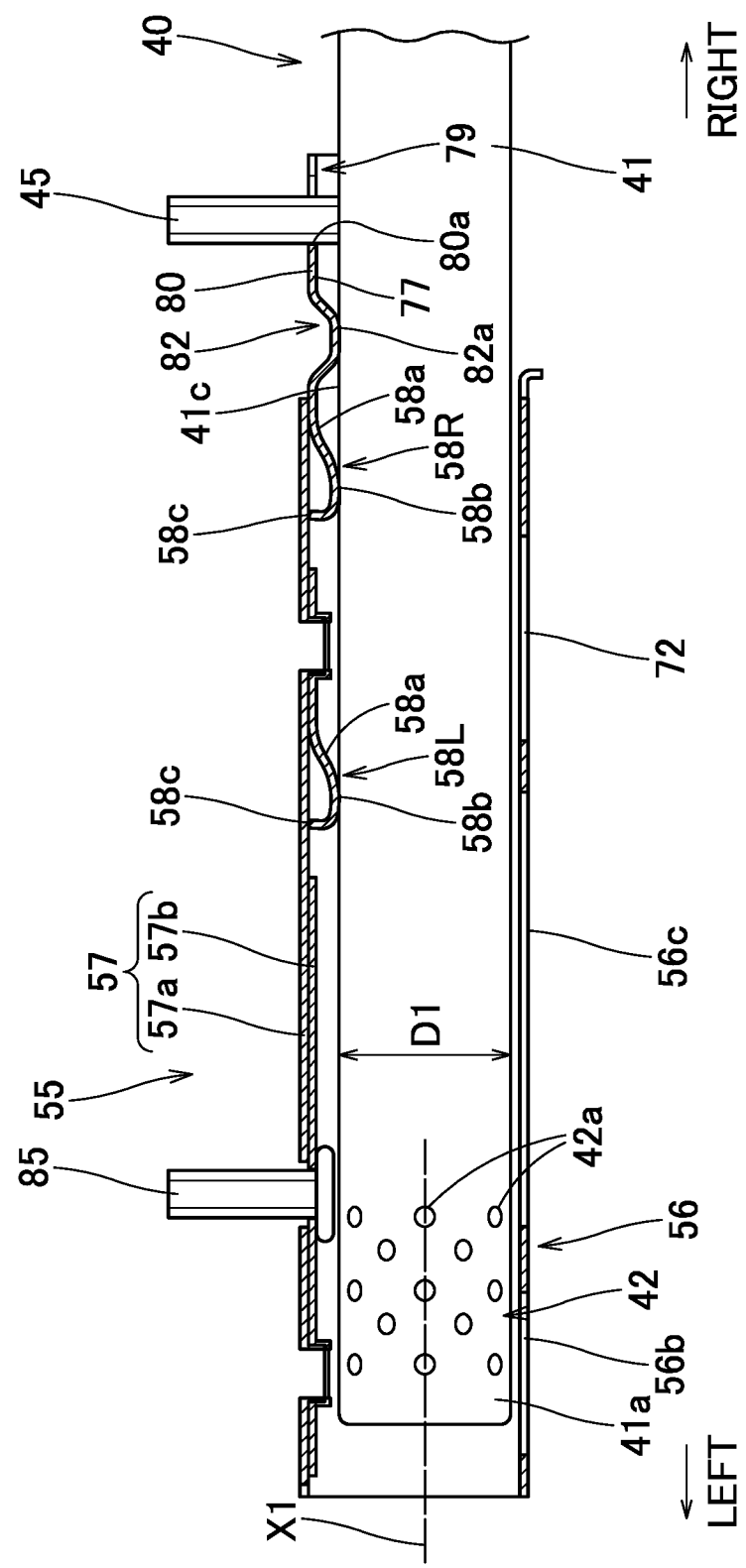
FIG. 14 is a cross sectional view of the retainer as mounted on an inflator.

The elastically deformable support region 58 is designed to bend at the sloping region 58a and abut against the outer circumference 41c of the inflator body 41 by the support body 58b when the inflator body 41 is inserted through the holding section 56, as shown in FIG. 14.

In the illustrated embodiment, the elastically deformable support region 58 is formed by clipping a portion of the inner region 57b of the double-wall bottom wall 57. The clipping provides a forming region 60 (double-dotted line in FIG. 10) which includes the elastically deformable support region 58 and an opening 61 disposed around the support region 58. This opening 61 is wholly closed off by a cover region 62 which is composed of the outer region 57a of the bottom wall 57, as shown in FIGS. 10, 11 and 13.

A protruding amount of the support body 58b of elastically deformable support region 58 out of the bottom wall 57 is such as to make the sloping region 58a bend or elastically deform and make the support body 58b abut against the outer circumference 41c of the inflator body 41 when the inflator body 41 is set in the holding section 56, as shown in FIG. 14. More particularly, the protruding amount of the support body 58b is determined such that the inflator body 41 is held by the support body 58b and leading ends of later-described supporting projections 70, with the sloping region 58a kept bent (or elastically deformed), and prevented from moving in the axial direction with respect to the holding section 56 when the inflator body 41 is set in the holding section 56. As shown in FIG. 14, the leading end 58c of the elastically deformable support region 58 is located at a distance from the outer region 57a (or cover region 62) of the bottom wall 57, as shown in FIG. 11, for providing an allowance for elastic deformation of the support region 58 (FIG. 14).

Further, the sloping region 58a of the elastically deformable support region 58 is configured to protrude obliquely inwardly towards the left (i.e. towards a direction away from the insert opening 56d) so as to assist with smooth insertion of the inflator body 41 into the holding section 56 via the insert opening 56d.

Figure 7:
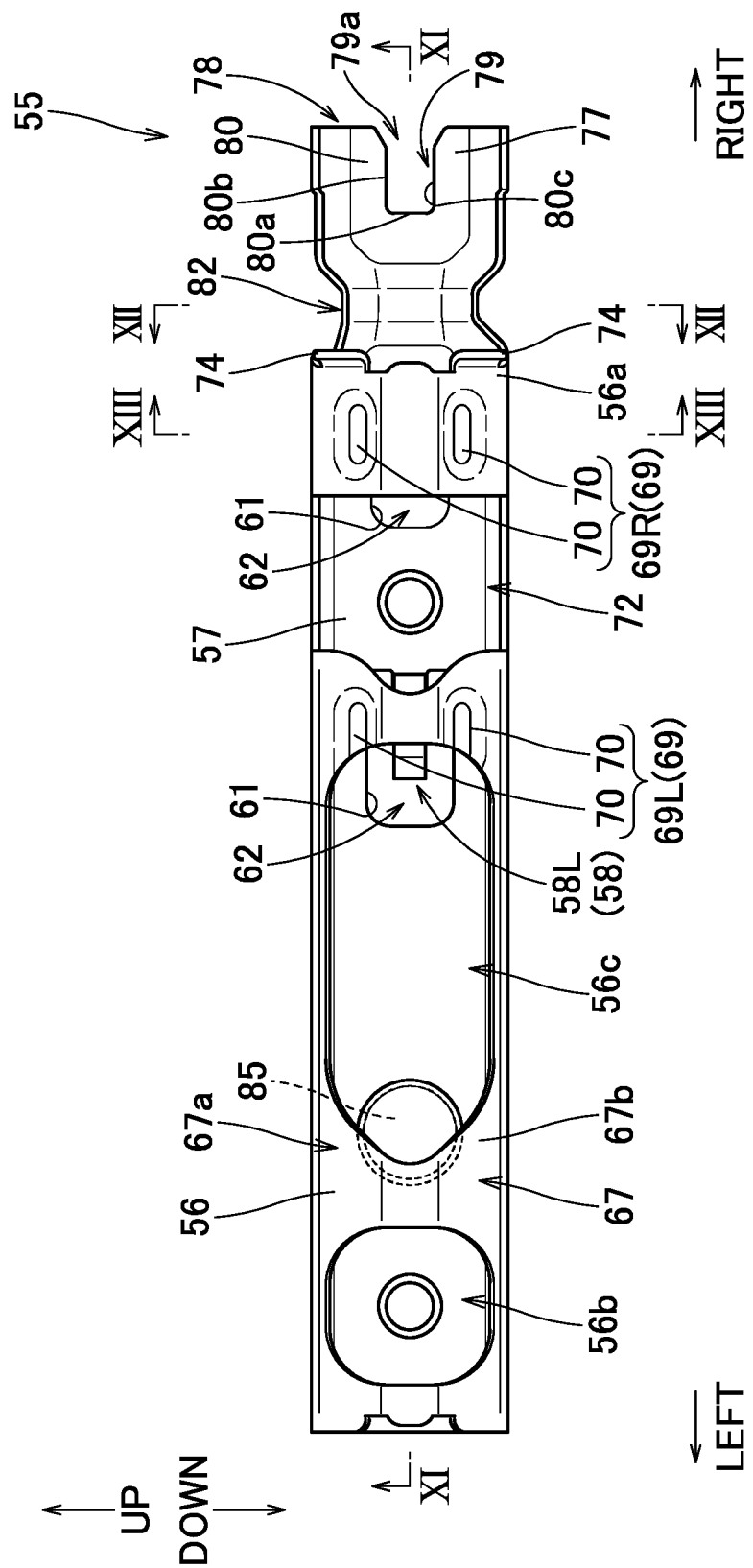
FIG. 7 is a front view of the retainer of FIG. 6 viewed from the rear.
Figure 8:
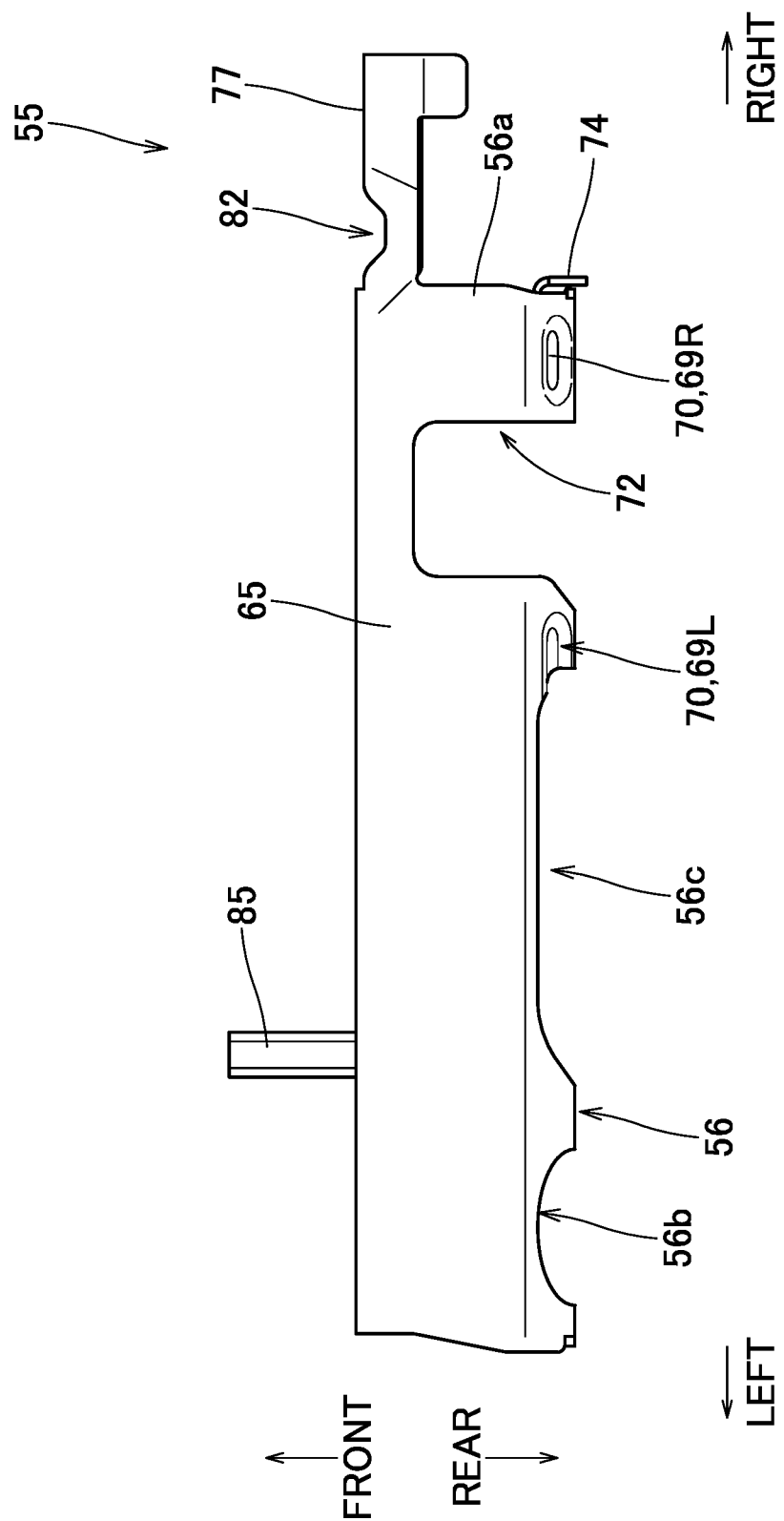
FIG. 8 is a plan view of the retainer of FIG. 6.

The elastically deformable support region 58 is provided, in cooperation with a later-described butt region 69 (or supporting projection 70), to hold the inflator body 41 as inserted into the retainer 55. As shown in FIGS. 7, 11 and 13, the support region 58 of the illustrated embodiment is disposed generally at the same position in a left and right direction (in an axial direction of the inflator 40) as the butt region 69 (or supporting projection 70), and at an opposite position to the butt region 69 (or supporting projection 70) in a front and rear direction. Moreover, the retainer 55 of the illustrated embodiment includes two such elastically deformable support regions 58L and 58R. Both of the elastically deformable support regions 58L and 58R are disposed to the right side of the center in a left and right direction of the bottom wall 57, interspatially in a left and right direction. More particularly, the support region 58R, which is located farther to the right side, is disposed in a vicinity of the right end 56a of the holding section 56, in other words, in a vicinity of the insert opening 56d or in a vicinity of and on the left of the pressing section 82.

The rear wall 67 of the holding section 56 includes a butt region 69 which abuts against the outer circumference 41c of the inflator body 41 as inserted through the holding section 56. The rear wall 67 of the illustrated embodiment includes two such butt regions 69L and 69R, which are disposed interspatially in a left and right direction. As shown in FIGS. 6, 7, 11 and 13, each of the butt regions 69L and 69R is disposed generally at the same position in a left and right direction (in the axial direction of the inflator 40) as the elastically deformable support region 58L/58R, opposite to the support region 58L/58R in a front and rear direction. That is, the butt region 69 and elastically deformable support region 58 are disposed on the same circumferential position about the axis of the inflator body 41 when the retainer 55 holds the inflator body 41. As shown in FIG. 13, in a sectional view taken along a front and rear direction, each of the butt regions 69L and 69R includes two supporting projections 70 which are disposed spaced-apart in a circumferential direction (in an up and down direction). Each of the supporting projections 70 is formed by denting each of the upper sloping region 67a and lower sloping region 67b of the rear wall 67 inwardly (i.e. towards the inflator body 41 or towards the front). The supporting projections 70 have higher rigidity than the support regions 58. The leading end 70a region of each of the supporting projections 70 is formed into a generally arcuate curve, and butts the outer circumference 41c of the inflator body 41. That is, in the illustrated embodiment, the elastically deformable support region 58 and two supporting projections 70 are arranged at the same circumferential positon of the inflator body 41, generally radially about the axis of the inflator body 41.

The holding section 56 further includes, between the butt regions 69L and 69R, a crimp opening 72 at which a later-described flap member 110 of the airbag 90 is pressed against the outer circumference 41c of the inflator body 41 to seal a later-described insert opening 94 of the airbag 90 (FIGS. 26 and 27) at airbag deployment. More particularly, as shown in FIGS. 6 to 8 and 11, the crimp opening 72 is formed in such a manner that a continuous portion on the upper wall 65, rear wall 67 and lower wall 66 of the holding section 56 is cut out. The width in a left and right direction of the crimp opening 72 is such as to allow the flap member 100, whose left edge 110c is a free end, to be pressed directly against the outer circumference 41c of the inflator body 41 when a pressure of an inflation gas G is applied thereto at airbag deployment.

Figure 9:
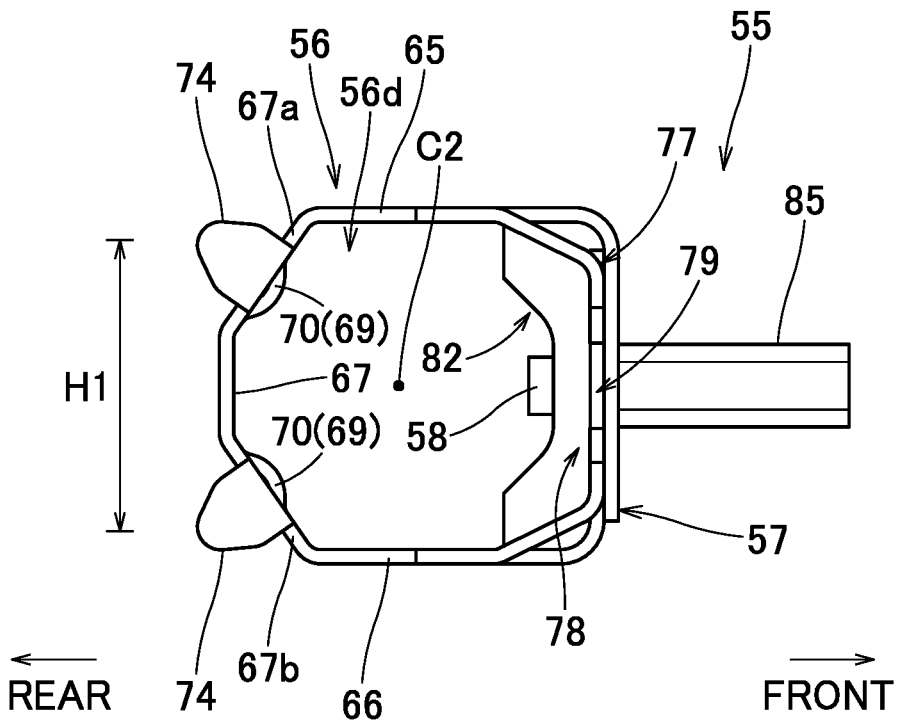
FIG. 9 is an enlarged side view of the retainer of FIG. 6 viewed from the right side.

At the right end 56a of the holding section 56 (or in the periphery of the insert opening 56d), there are formed two retaining pawls 74 which are to protrude out of a later-described insert opening 94 of the airbag 90 when the retainer 55 is stored inside the airbag 90 and the airbag 90 is folded up. The retaining pawls 74 are disposed spaced-apart in a circumferential direction of the inflator body 41. In the illustrated embodiment, as shown in FIG. 9, each of the retaining pawls 74 protrudes rearward out of the edge of each of the upper sloping region 67a and lower sloping region 67b. That is, the retaining pawls 74 are disposed at the rear area of the holding section 56, apart from the bottom wall 57. More particularly, the retaining pawls 74 are located at two circumferential positions of the inflator 40 (or of the holding section 56) which are distant generally by a diameter of the inflator body 41. That is, the clearance H1 between the retaining pawls 74 (FIG. 9) generally coincides with the diameter D1 of the inflator body 41 (FIG. 14). When the airbag device S of the illustrated embodiment is assembled, the retainer 55 is stored inside the airbag 90 first and the airbag 90 is folded up. After that, the body 41 of the inflator 40 is inserted into the airbag 90 via the insert opening 94 such that the inflator 40 is set inside the retainer 55 via the insert opening 56d. For a smooth insertion of the inflator body 41 into the retainer 55, the retaining pawls 74 assists with alignment of the positions of the insert opening 94 of the airbag 90 and the insert opening 56d of the retainer 55 (in other words, alignment of an insertion center C2 of the insert opening 56d of the retainer 55 and an insertion center C3 of the insert opening 94 of the airbag 90, see FIGS. 9, 19 and 23).

The bolt 85 serving as mounting means is disposed in an area to the left of the center in a left and right direction of the bottom wall 57, i.e. in an area distant from the elastically deformable support regions 58 in a left and right direction. More particularly, the location of the bolt 85 is apart from the left end of the bottom wall 57 by a quarter of the length of the bottom wall 57. The bolt 85 protrudes generally vertically out of the bottom wall 57, so as to be generally perpendicular to the axis of the inflator body 41 (in other words, generally perpendicularly to the inflator body 41).

The storing cove section 78 for storing the bolt 45 of the inflator 40 is disposed in a vicinity of the right end 57c of the bottom wall 57, on the right side of the holding section 56. Specifically, the storing cove section 78 is disposed in an extended region 77 which continues from the bottom wall 57. The storing cove section 78 includes a dent 79 which is indented from the right edge 77a of the extended region 77, and a peripheral region 80 which forms the periphery of the dent 79. The extended region 77 is formed into a flat plate extending generally along the bottom wall 29 of the case 28. That is, the extended region 77 is formed generally into an extension of the bottom wall 57 of the holding section 56. The dent 79 has its opening 79a at the right edge 77a of the extended region 77 and extends in a left and right direction as shown in FIG. 7, and receives the bolt 45 of the inflator 40 when the inflator body 41 is set in the holding section 56. The width in a front and rear direction of the dent 79 is slightly greater than a diameter of the bolt 45. In the illustrated embodiment, the dent 79 is so formed that the right end region enlarges towards the opening 79a for easy insertion of the bolt 45, as shown in FIG. 7. If the bolt 45 of the inflator body 41 is inserted into the dent 79 via the opening 79a at the setting of the inflator body 41 inside the holding section 56 of the retainer 55, the peripheral region 80 (specifically, an upper peripheral region 80b and a lower peripheral region 80c, see FIG. 7) helps set the bolt 45 in an adequate posture to protrude generally in the same direction as the bolt 85 of the retainer 55, as shown in FIG. 14. And if the bolt 45 is inserted into the dent 79 until abuts against the left edge 80a of the peripheral region 80, the bolt 45 is positioned with an adequate distance from the bolt 85 of the retainer 55 such that the bolt 45 and the bolt 85 smoothly go into the apertures 29a and 29b formed on the bottom wall 29 of the case 28 at one time.

Figure 12:
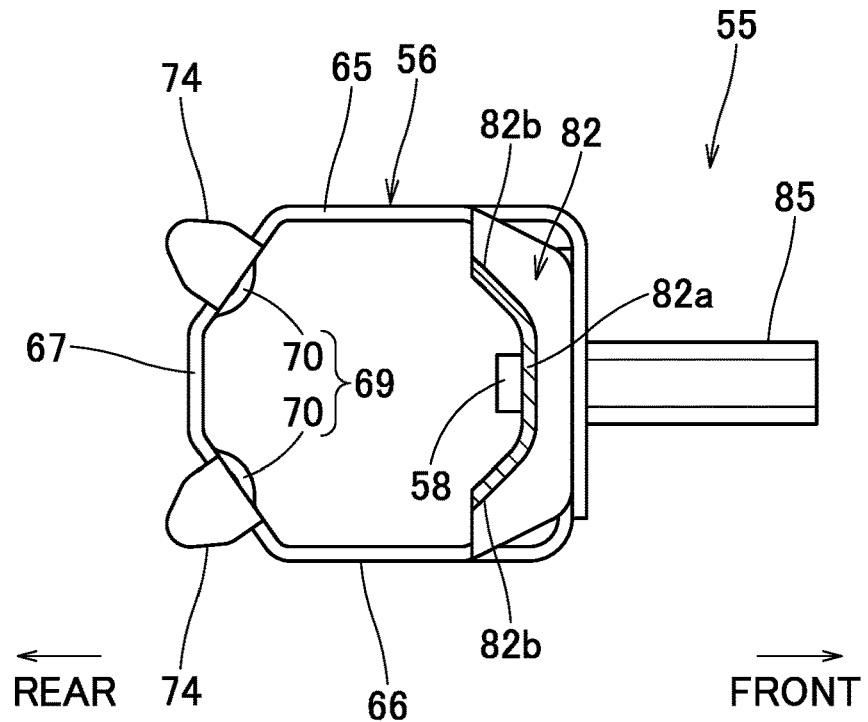
FIG. 12 is an enlarged sectional view of the retainer taken along line XII-XII of FIG. 7.
Figure 15:
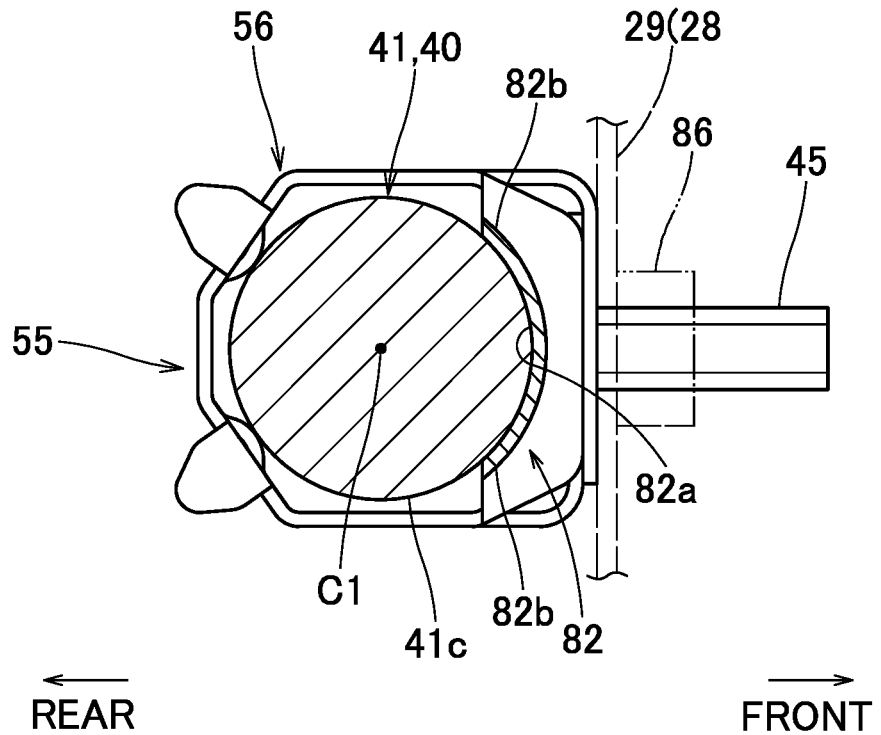
FIG. 15 is a sectional view of the retainer as assembled with the inflator, taken at the location of a pressing section.
Figure 25:
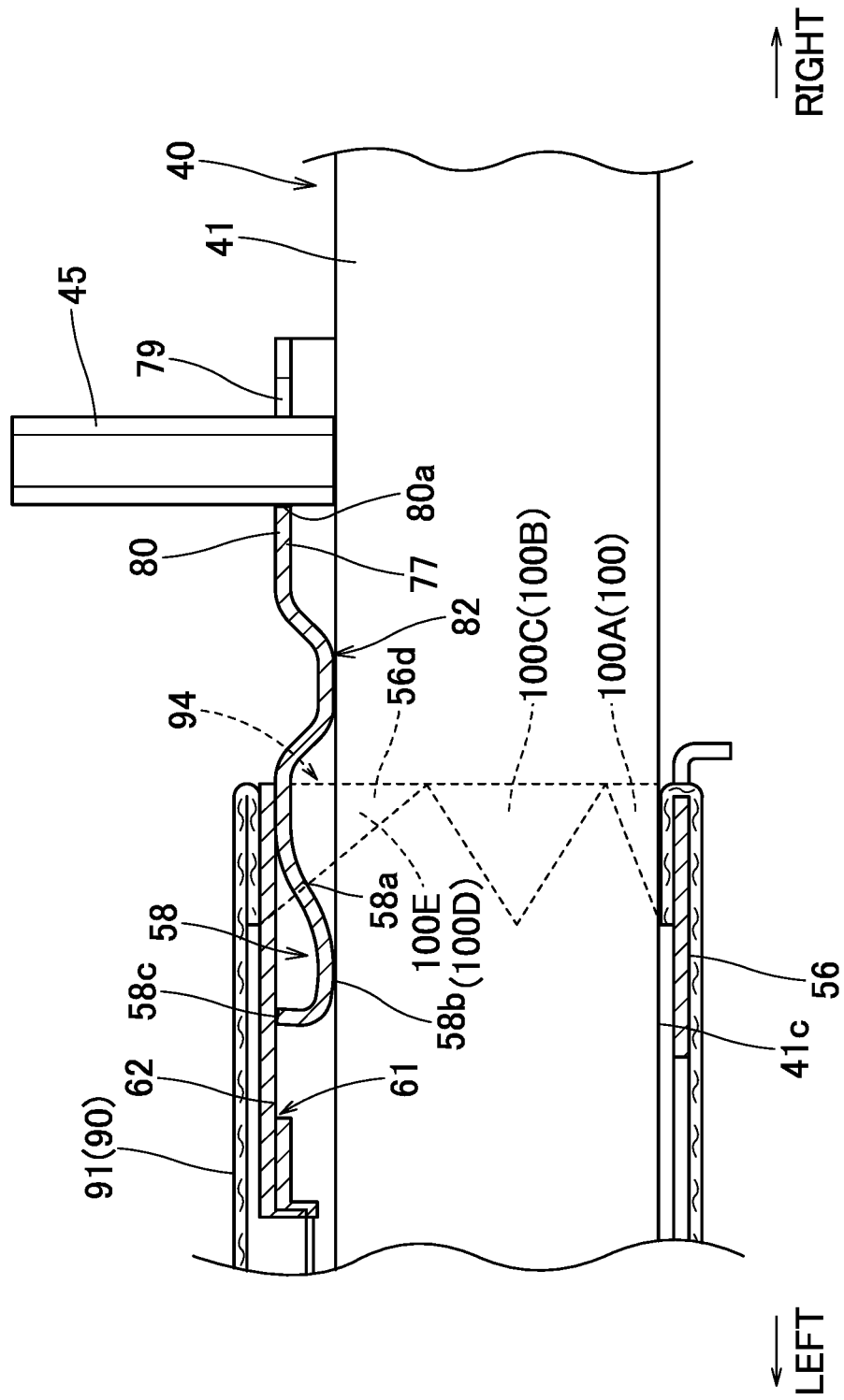
FIG. 25 is a schematic partial sectional view showing the inflator as inserted into the retainer.

The pressing section 82 is disposed between the bottom wall 57 of the holding section 56 and the extended region 77. Specifically, the pressing section 82 is disposed in a vicinity of the storing cove section 78, between the bolt 85 and the storing cove section 78. The pressing section 82 is designed to be pressed onto the outer circumference of the body 41 of the inflator 40 when the bolt 45 of the inflator 40 is fastened to the bottom wall 29 of the case 28. More particularly, the pressing section 82 is designed to be brought into contact with an extensive area in a circumferential direction of a front area of the outer circumference 41c of the inflator body 41 as mounted on board. As viewed from the left or right as mounted on board, the pressing section 82 extends upward and downward from the bolt 45, as shown in FIG. 15. More particularly, as viewed from the left or right, the pressing section 82 has such a curved shape as to be capable of contacting a generally quarter circumferential area of the circumference 41c of the inflator body 41. Moreover, as shown in FIG. 11, in a sectional view taken along the axial direction of the inflator body 41 (or holding section 56), the pressing section 82 has such a sectional contour that rises out of the bottom wall 57 gently. As shown in FIG. 11, the protruding amount of the pressing section 82 out of the bottom wall 57 is smaller than that of the support region 58 as has not yet been assembled with the inflator 40. When the inflator body 41 is set in the retainer 55 and the elastically deformable support regions 58 are deformed, the leading end region 82a of the pressing section 82 is brought into contact with the outer circumference 41c of the inflator body 40, as shown in FIG. 14. To describe more specifically, as shown in FIG. 12, the sectional contour in a front and rear direction of the leading end region 82a of the pressing section 82 is not a generally circular arc, although gently curving in a front and rear direction. However, when the airbag 90 as holds the inflator 40 and retainer 55 inside is housed in the case 28 and the bolt 45 of the inflator 40 is fastened with a nut 86, the pressing section 82 is pressed by the inflator body 41 and deformed such that upper and lower edges 82b of the leading end region 82a are flattened as shown in FIG. 15. The leading end region 82a of the pressing section 82 is then brought into contact with the outer circumference 41c of the inflator body 40 as a whole while the inflator 40 is housed inside the case 28. That is, while the airbag device S is mounted on the vehicle, a generally whole area in the circumferential direction of the leading end region 82a of the pressing section 82 stays pressed onto the front area (i.e. the area facing towards the bottom wall 57) of the outer circumference 41c of the inflator body 41. The pressing section 82 is located adjacent the insert opening 56d of the holding section 56. In other words, as shown in FIGS. 3 and 25, when the retainer 55 is stored inside the airbag 90, the pressing section 82 is disposed outside of the airbag 90 at a vicinity of the insert opening 94 of the airbag 90. Since the pressing section 82 is in close contact with the outer circumference 41c of the inflator body 41 by its extensive and continuous area in the circumferential direction as shown in FIG. 15, the pressing section 82 is capable of preventing an inflation gas from flowing towards the insert opening 94 of the airbag 90. Accordingly, the pressing section 82 is further capable of preventing the inflation gas, which flows through a gap between the bottom wall 57 and inflator body 41, from flowing towards the bolt 45 as shown in FIGS. 3 and 25. Thus the airbag 90 will inflate quickly with little fear of gas leakage despite the configuration that an area of the inflator 40 having the bolt 45 is disposed outside of the airbag 90.

Figure 16:
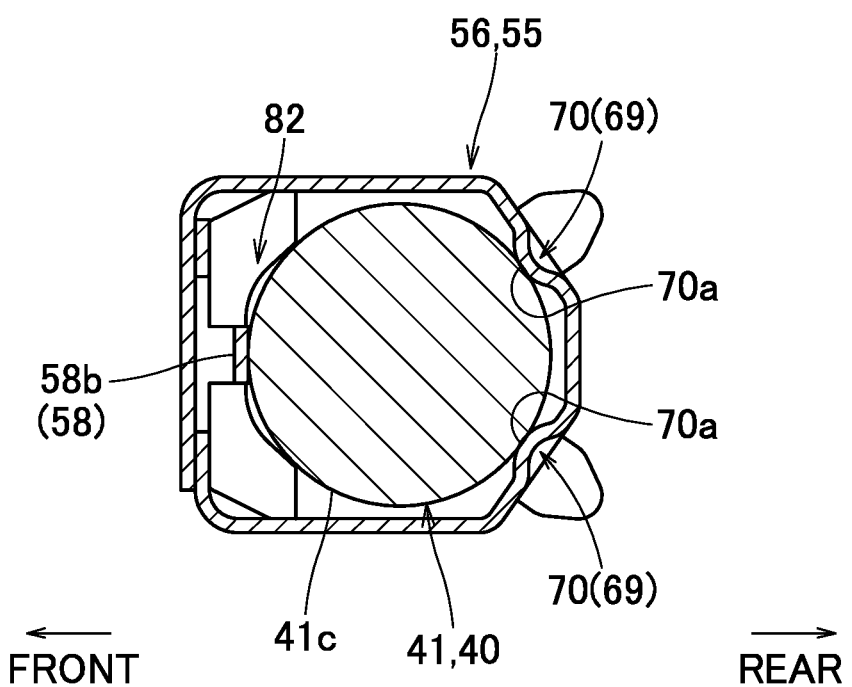
FIG. 16 is a sectional view of the retainer as assembled with the inflator, taken at the location of the elastically deformable support region and supporting projections.

As described above, in the retainer 55 of the illustrated embodiment, the elastically deformable support region 58 and two supporting projections 70 are arranged at three generally radial positions about the axis of the inflator 40 (i.e. inflator body 41), and the outer circumference 41c of the inflator body 41 is supported by the support body 58b of the elastically deformable support region 58 and the leading end 70a regions of the supporting projections 70 at three circumferentially spaced-apart positions when the inflator body 41 is set inside the holding section 56, as shown in a FIG. 16. This configuration will help match the axial center C1 of the inflator body 41 (FIG. 15) and the axial center of the holding section 56 when the inflator body 41 is set inside the holding section 56. Here, the axial center of the holding section 56 equals to the insertion center C2 of the insert opening 56d of the retainer 55, as shown in FIG. 9. In the illustrated embodiment, moreover, since the set of the elastically deformable support region 58 and butt region 69 are disposed at two spaced-apart positions in a left and right direction (in the axial direction of the inflator body 40), the support as described above takes place at two lengthwise interspatial positions. This configuration will help keep the central axis X1 (FIG. 14) of the inflator body 41 and the central axis X2 (FIG. 11) of the holding section 56 matched while the inflator body 41 is held by the holding section 56. Furthermore, since each of the elastically deformable support regions 58L and 58R supports the inflator body 41 in an elastically deformed state, the inflator body 41 is prevented from moving in the axial direction. Accordingly, merely by setting the inflator body 41 in the holding section 56 via the insert opening 56d and pushing the bolt 45 into the dent 79 of the storing cove section 78 until the bolt 45 abuts against the left edge 80a of the peripheral region 80, the outer circumference 41c of the inflator body 41 will be provisionally supported by the support bodies 58b of the elastically deformable support regions 58L and 58R and the leading end 70a regions of the supporting projections 70, with little fear that the inflator body 41 moves with respect to the holding section 56. Moreover, although the bolt 45 is merely inserted into the dent 79 via the opening 79a, the bolt 45 will be easily and adequately positioned with respect to the bolt 85 of the retainer 55, and prevented from moving inside the dent 79.

In the airbag device S of the illustrated embodiment, the retainer 55 and inflator body 41 are preliminarily put inside the airbag 90, and the airbag 90 is stored in the case 28 as it is such that the bolt 85 of the retainer 55 and the bolt 45 of the inflator 40 protrude out of the bottom wall 29 of the case 28. Then the bolts 45 and 85 are fastened with nuts 86, such that the inflator 40 and airbag 90 are mounted on the bottom wall (i.e. the vehicle body member) 29 of the case 28. When the bolts 45 and 85 are fastened with the nuts 86, the pressing section 82 of the retainer 55 supports the inflator body 41 at a vicinity of the bolt 45, thus the inflator body 41 is securely held by the retainer 55 such that the central axis is fixed with respect to the holding section 56 without inclination (i.e. such that the central axis does not slip in a perpendicular direction).

Figure 17:
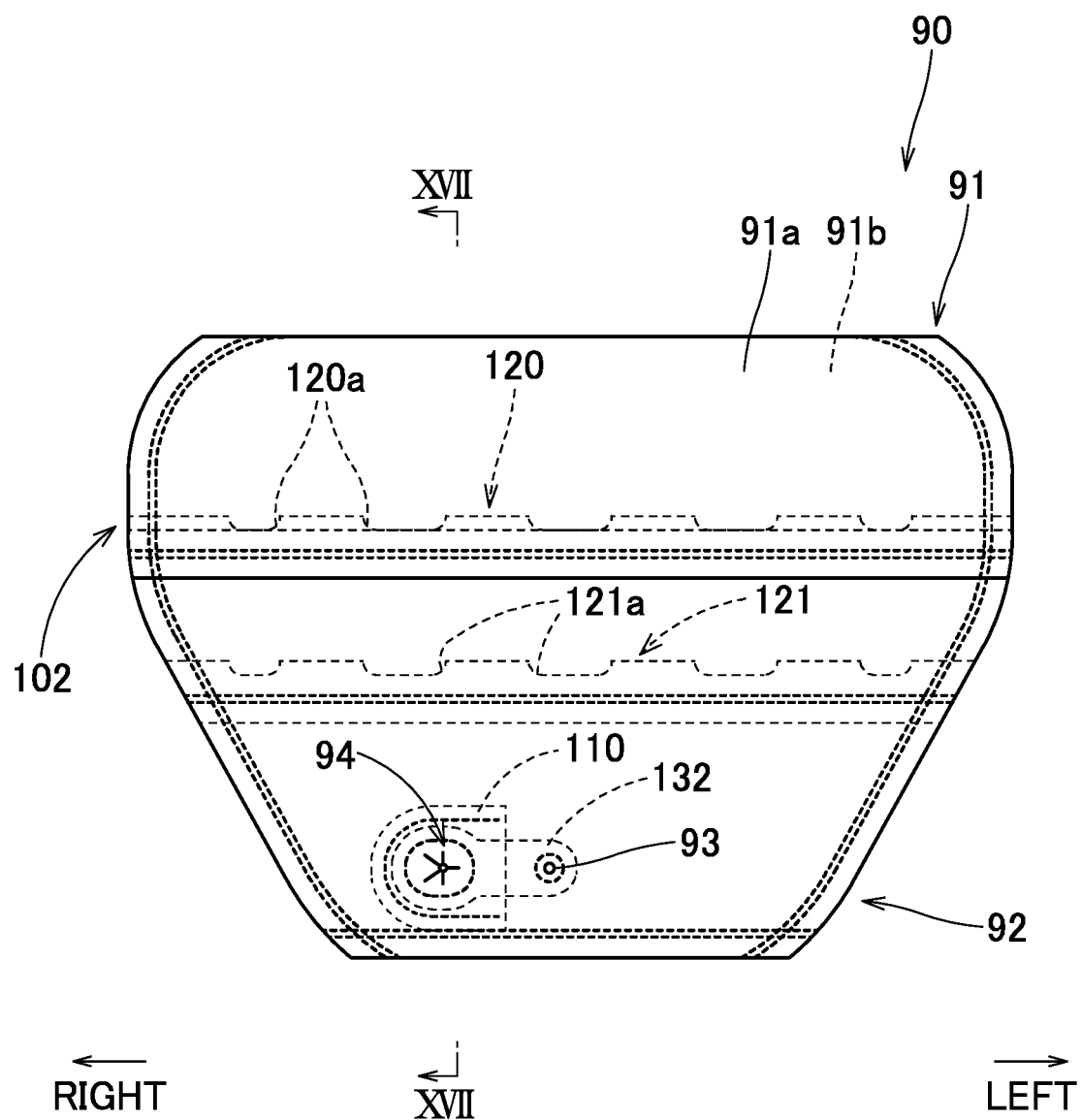
FIG. 17 is a back view of an airbag for use in the airbag device of the embodiment.
Figure 20:
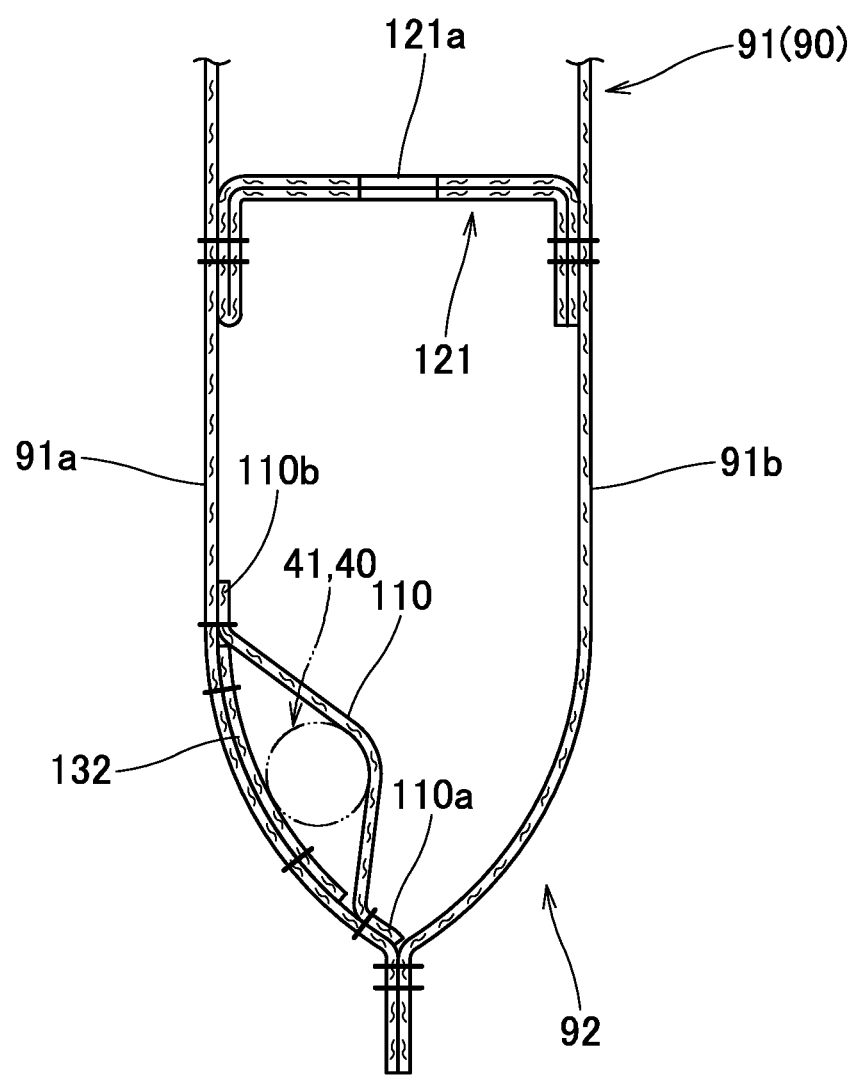
FIG. 20 is a partial enlarged vertical sectional view of the airbag showing especially a mount region.

As shown in FIGS. 17, 18 and 20, the airbag 90 of the illustrated embodiment includes a bag body 91, a flap member 110 disposed inside the bag body 91 and two tethers 120 and 121 disposed inside the bag body 91.

The bag body 91 is designed to be inflated into a generally rectangular board for protecting left and right knees K (KL and KR) of the driver D, as shown in FIG. 4 (double-dotted lines) and FIG. 17. As shown in FIG. 17, the bag body 91 is formed by joining together peripheral edges of two walls having generally identical contours; a vehicle body side wall 91a which is deployable towards the steering column 7 and an occupant side wall 91b which is deployable toward the driver's seat. The bag body 91 includes a mount region 92 which is disposed towards the case 28 when deployed and a protecting region 102 which is greater in width in a left and right direction than the mount region 92 and protects the driver's knees K (KL and KR).

Figure 19:
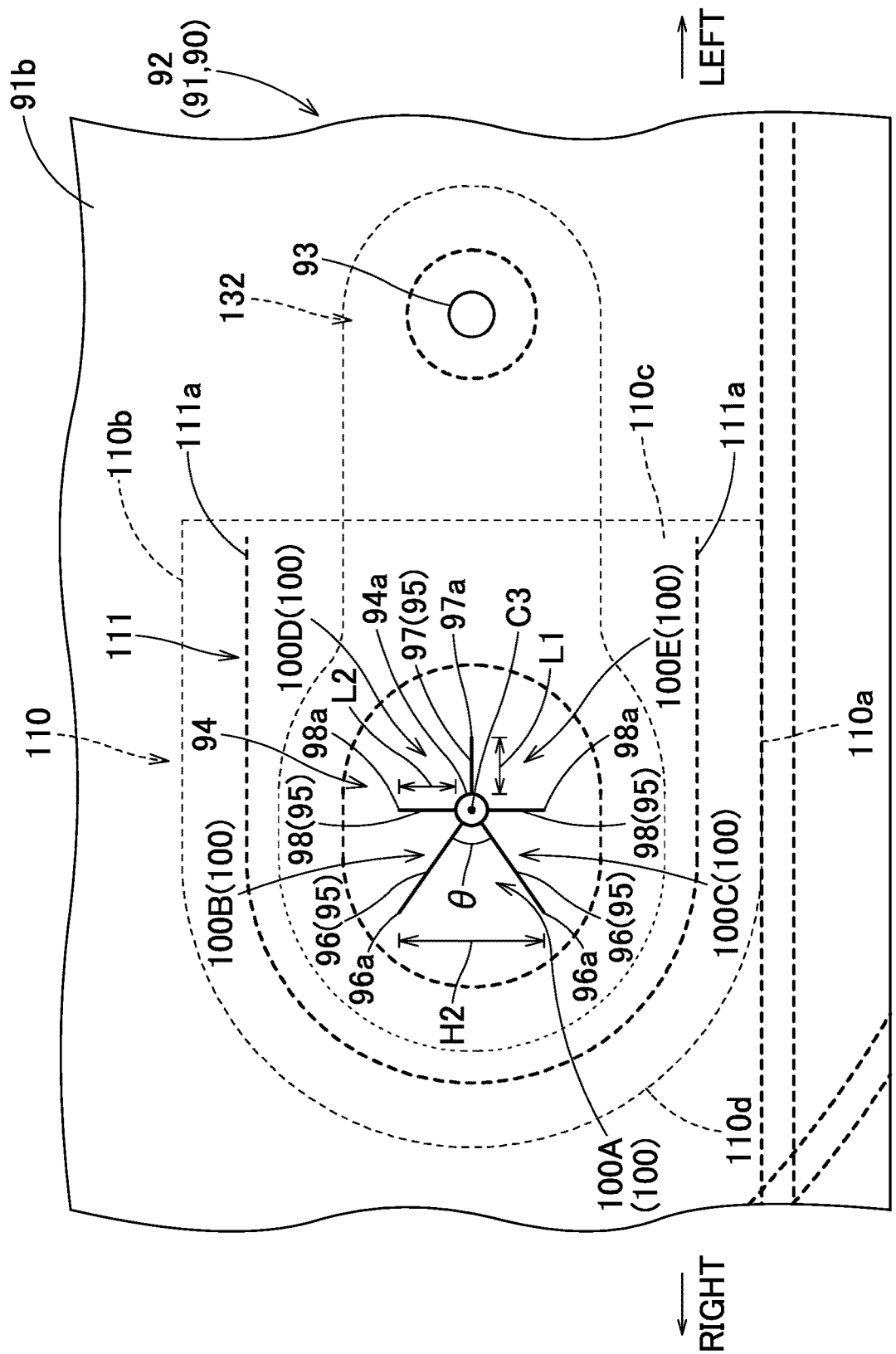
FIG. 19 is a partial enlarged back view of the airbag showing especially an insert opening.

As shown in FIGS. 17 and 19, the mount region 92 includes, on the vehicle body side wall 91a, an insert opening 94 via which the inflator body 41 is inserted into the bag body 91, and a mounting hole 93 out of which the bolt 85 of the retainer 55 protrudes. The insert opening 94 is formed in a vicinity of the right end of the mount region 92 and the mounting hole 93 is disposed to the left of the insert opening 94. In the illustrated embodiment, the mounting hole 93 is located slightly to the right of the center in a left and right direction of the bag body 91.

The insert opening 94 is composed of an opening-forming region which includes a plurality of slits 95 formed on the vehicle body side wall 91a. In the illustrated embodiment, more specifically, the insert opening 94 includes a small round aperture 94a which forms an insertion center C3 of the opening 94 as the inflator body 41 is inserted, and the slits 95 extend from the aperture 94a, as shown in FIG. 19. The slits 95 of the illustrated embodiment includes two retaining slits 96, a first auxiliary slit 97 and two second auxiliary slits 98. In the illustrated embodiment, the set of slits 95 is generally symmetric with respect to a horizontal line running through the insertion center C3 (i.e. generally symmetric in an up and down direction as mounted on board) when the bag body 91 is flatly unfolded.

Figure 23:
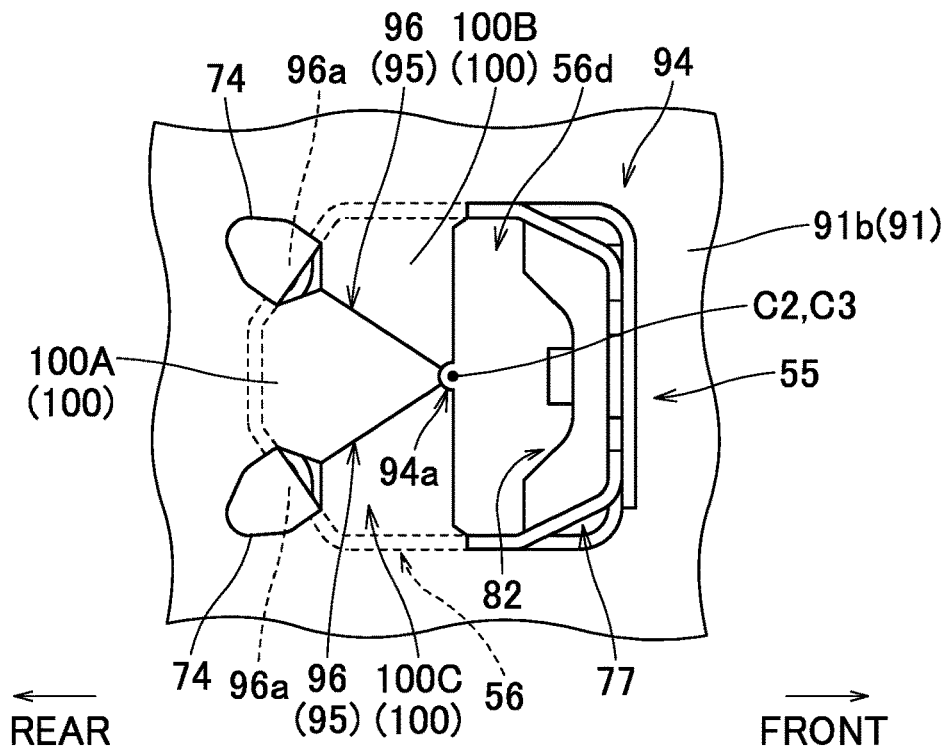
FIG. 23 is a diagram showing the insert opening of the airbag as the retainer is set inside the airbag.

When the bag body 91 is flatly unfolded as shown in FIG. 19, the two retaining slits 96 extend diagonally towards the right from the aperture 94a (i.e. the insertion center C3) such that the terminals 96a draw away from each other in a front and rear direction. That is, the retaining slits 96 intersect each other at the aperture 94a and adjoin each other on the right side of the aperture 94a. Further, the retaining slits 96 are configured to allow the retaining pawls 74 of the retainer 55 to protrude out of the terminals 96a as shown in FIG. 23, when the retainer 55 is disposed inside the airbag 90. That is, the distance H2 (FIG. 19) between the terminals 96a of the retaining slits 96 is the same as the clearance H1 between the retaining pawls 74 and generally the same as the diameter D1 of the inflator body 41. In the illustrated embodiment, the intersection angle θ (FIG. 19) between the two retaining slits 96 is approximately 80°. When mounted on board, the retaining slits 96 extend diagonally rearward from the aperture 94a in such a manner as to draw away from each other in an up and down direction.

When the bag body 91 is flatly unfolded as shown in FIG. 19, the first auxiliary slit 97 extends towards the left from the aperture 94a (i.e. the insertion center C3) in such a manner as to draw apart from the retaining slits 96. The first auxiliary slit 97 of the illustrated embodiment is formed into a straight line extending generally in a left and right direction. The length L1 of the first auxiliary slit 97 is approximately a half of the diameter D1 of the inflator body 41. When mounted on board, the first auxiliary slit 97 extends generally along a front and rear direction towards the bottom wall 29 of the case 28, i.e. towards the front, from the aperture 94a. The two second auxiliary slits 98 extend towards opposite directions from the aperture 94a, generally perpendicularly to the first auxiliary slit 97. When the bag body 91 is flatly unfolded as shown in FIG. 19, the second auxiliary slits 98 extend forward and backward from the aperture 94a (i.e. the insertion center C3). Each of the second auxiliary slits 98 of the illustrated embodiment is a straight line extending generally in a front and rear direction. The length L2 of each of the second auxiliary slits 98 is generally the same as the length L1 of the first auxiliary slit 97, i.e. approximately a half of the diameter D1 of the inflator body 41. That is, in the illustrated embodiment, the terminals 98a of the second auxiliary slits 98 are located on a same horizontal line as the terminals 96a of the retaining slits 96. When mounted on board, the second auxiliary slits 98 extend upward and downward from the aperture 94a (i.e. the insertion center C3) generally along an up and down direction. In order to prevent a wrong or incorrect assembly of the retainer 55, it is preferable that the first auxiliary slit 97 and second auxiliary slits 98 are disposed apart from the retaining slits 96, more particularly, in an opposite side of the retaining slits 96 with respect to the insertion center C3 (i.e. on a front side of the insertion center C3 as mounted on board, or at a position 180° apart from the retaining slits 96).

Figure 24:
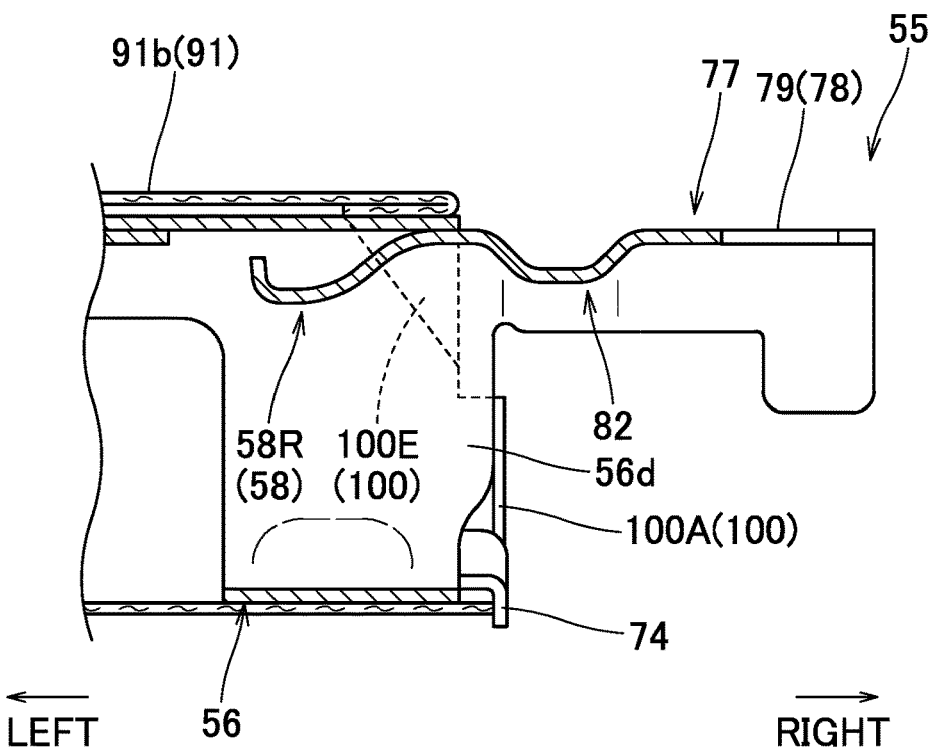
FIG. 24 is a schematic sectional view showing the insert opening of the airbag as the retainer is set inside the airbag.

When the inflator body 41 is inserted into the airbag 90 via the insert opening 94, areas among the retaining slits 96, first auxiliary slit 97 and second auxiliary slits 98 are folded inward so as to be brought into contact with the outer circumference 41c of the inflator body 41, and each serve as a folded sealing region 100 for covering the outer circumference 41c of the inflator body 41. As shown in FIG. 19, five folded sealing regions 100A, 1008, 100C, 100D and 100E are provided in the illustrated embodiment. Each of the folded sealing regions 100 is folded on a straight line connecting adjoining leading ends 96a, 97a or 98a, and formed generally into a triangle. To describe more specifically, in the illustrated embodiment, the folded sealing regions 100D and 100E, which are composed of the areas between the first auxiliary slit 97 and second auxiliary slits 98 (i.e. the areas disposed in front of the insertion center C3 as mounted on board), are folded inward and brought into contact with the outer surface of the front area (i.e. the bottom wall 57 and front areas of the upper wall 65 and lower wall 66) of the holding section 56 of the retainer 55 when the retainer 55 is set inside the airbag 90 before the inflator 40 is inserted, as shown in FIG. 24.

Figure 26:
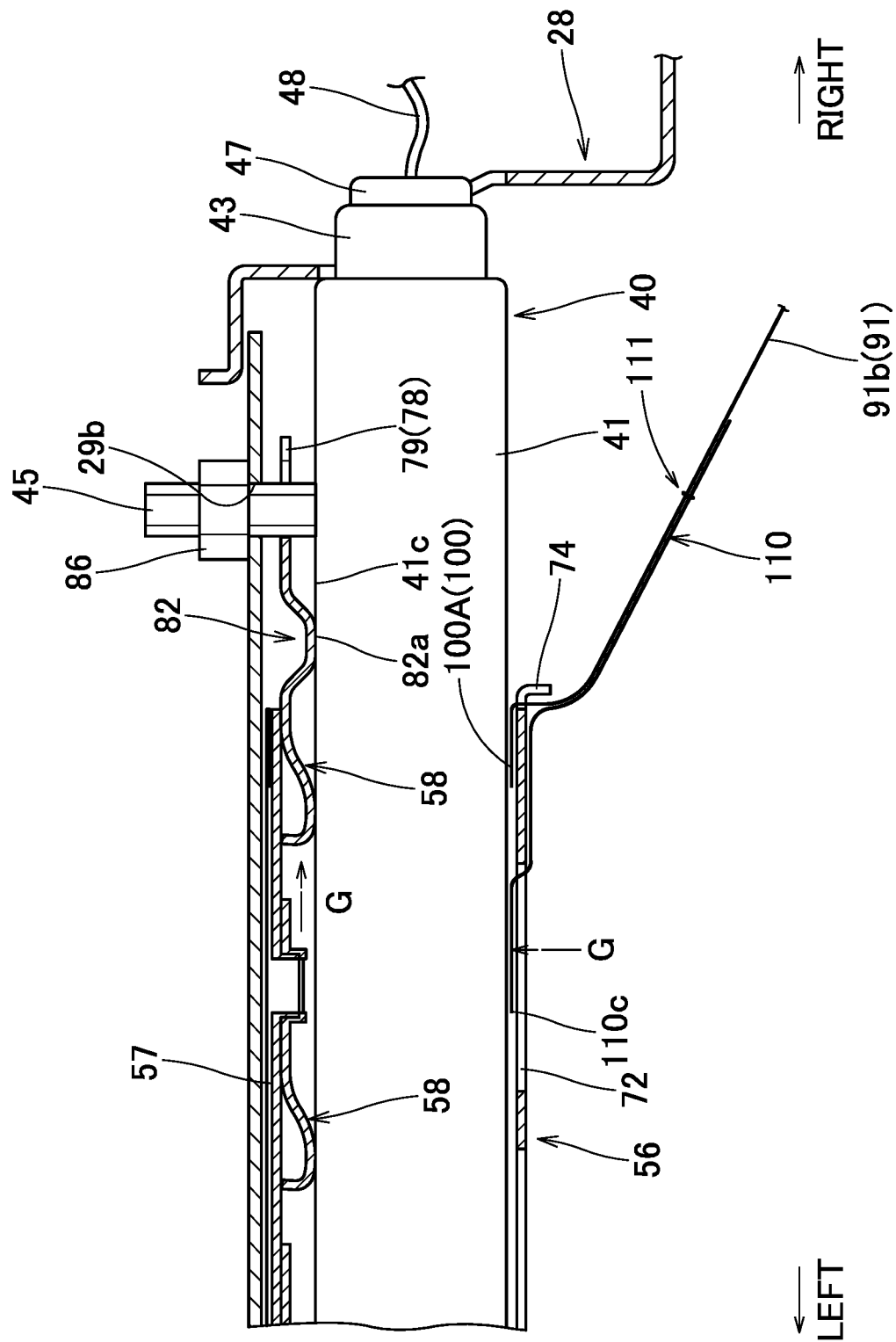
FIG. 26 is a partial enlarged horizontal sectional view of the airbag device of the illustrated embodiment at airbag deployment.
Figure 27:
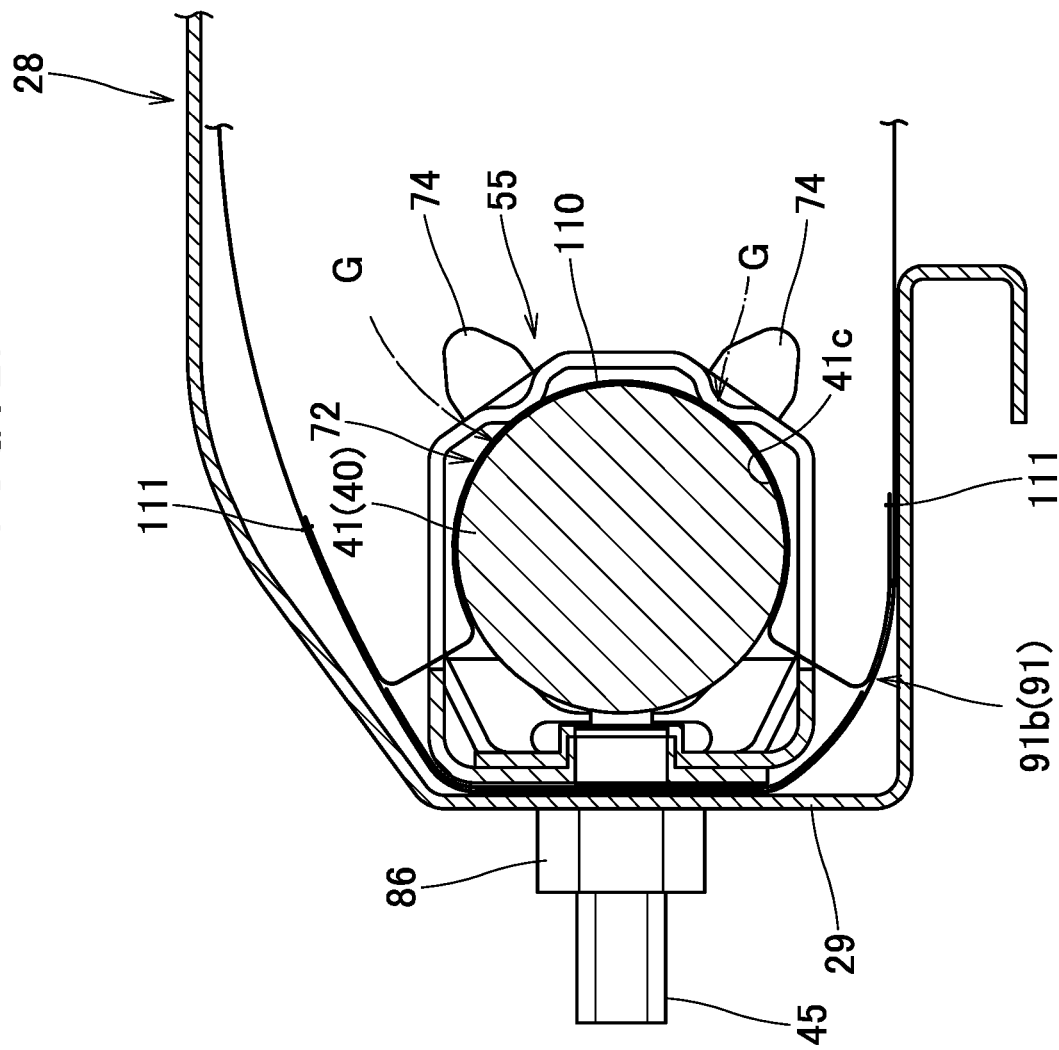
FIG. 27 is a partial enlarged vertical sectional view of the airbag device of the illustrated embodiment at airbag deployment.

Referring to FIGS. 19 and 20, the flap member 110 is disposed inside the bag body 91 so as to cover the insert opening 94. The outer peripheral edge of the flap member 110 except the left edge 110c is joined to the vehicle body side wall 91a of the bag body 91. Specifically, the flap member 110 in a flattened state has such an outer contour that the front edge 110a and rear edge 110b are straight lines extending generally along a left and right direction, the left edge 110c is a straight line extending generally along a front and rear direction and the right edge 110d is a generally semicircular arc. The left edge 110c of the flap member 110, which is a free end, is located slightly to the left (i.e. towards the mounting hole 93) of the center of a clearance between the mounting hole 93 and the insertion center C3 (or aperture 94a) of the insert opening 94. The front edge 110a, right edge 110d and rear edge 110b of the flap member 110 are joined to the vehicle body side wall 91a of the bag body 91 with a single continuous seam 111 such that the flap member 110 closes off the insert opening 94 on the three sides except the left side. The seam 111 extends farther towards the left beyond the insert opening 94. When the retainer 55 is put inside the bag body 91, the flap member 110 covers the outer circumference of the holding section 56. When the airbag device S is mounted on board, as shown in FIG. 26, the left edge 110c of the flap member 110 is disposed in the crimp opening 72 of the retainer 55, at the rear side of the holding section 56. At airbag deployment, the flap member 110 is subjected to a pressing force of an inflation gas G and thrusts into the crimp opening 72, and is pressed onto the outer circumference 41c of the inflator body 41, as shown in FIGS. 26 and 27. Thus the left edge 110c region of the flap member 110 is forcefully pressed onto the outer circumference 41c of the inflator body 41 and prevents a gas leakage out of the insert opening 94.

The tethers 120 and 121 are disposed one above the other inside the bag body 91 and each extend generally along a left and right direction. The tethers 120 and 121 are provided to limit the thickness of the bag body 91 at deployment. The tether 120, which is disposed on the lower side, partitions the protecting region 102 from the mount region 92. The tether 121, which is disposed on the upper side, partitions the protecting region 102 into two in the middle. Each of the tethers 120 and 121 is provided with a plurality of gas communication holes 120a/121a for allowing gas communication.

Figure 22:
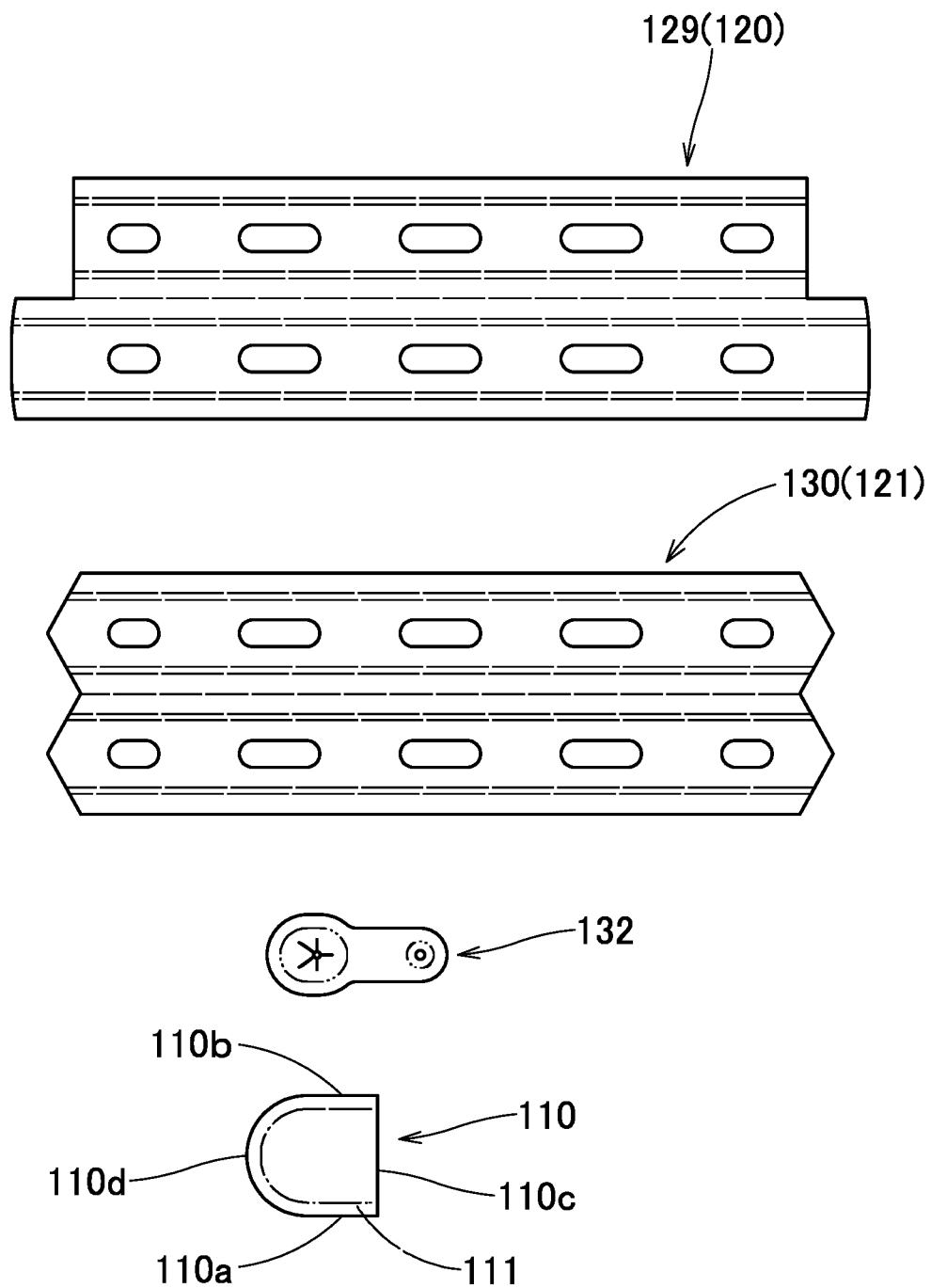

In the illustrated embodiment, the airbag 90 is composed of a plurality of base materials cut in predetermined contours. The base materials are formed of a fabric woven with polyester, polyamide yarns or the like, and the airbag 90 is formed by sewing the base materials together with a sewing thread. As shown in FIGS. 21 and 22, the airbag 90 of the illustrated embodiment is composed of three body base cloths 125, 126 and 127 for forming the vehicle body side wall 91a and occupant side wall 91b, two tether base cloths 129 and 130, the flap member 110 and a reinforcing cloth 132.

The body base cloth 125 forms an area of the vehicle body side wall 91a from the mount region 92 to the location of the upper tether 120 (i.e. an area of the vehicle body side wall 91a disposed below the upper tether 120). The body base cloth 126 forms an area of the occupant side panel 91b from the mount region 92 to the location of the tether 120 (i.e. an area of the occupant side wall 91b below the tether 120). The body base cloth 127 forms areas of the vehicle body side wall 91a and occupant side wall 91b above the tether 120. The tether base cloths 129 and 130 form the tethers 120 and 121 each in a doubled state. The reinforcing cloth 132 is used to reinforce an area encompassing the mounting hole 93 and insert opening 94, and is sewn to the vehicle body side wall 91a at the periphery of the mounting hole 93 and periphery of the insert opening 94.

Mounting of the airbag device S on the vehicle is now described. Firstly, the retainer 55 is put inside the airbag 90 via the insert opening 94 and disposed such that the bolt 85 protrudes out of the mounting hole 93. Then each of the retaining pawls 74 of the retainer 55 is taken out of a vicinity of each of the terminals 96a of the retaining slits 96 of the insert opening 94. At this time, as shown in FIG. 24, the folded sealing regions 100D and 100E, which are composed of the areas between the first auxiliary slit 97 and second auxiliary slits 98, are folded inward so as to cover the outer surface of the front area (i.e. the bottom wall 57 and front areas of the upper wall 65 and lower wall 66) of the holding section 56 of the retainer 55, such that the front area of the insert opening 94 is opened, as shown in FIG. 23. Then the airbag 90 is folded up so as to fit in the case 28, and wrapped up with a wrapping member (not shown) for keeping the folded-up configuration. The bolt 85 of the retainer 55 and the area around the insert opening 94 are taken out of the wrapping member, and the retaining pawls 74 of the retainer 55 are kept outside of the retaining slits 96.

Then the body 41 of the inflator 40 is set in the airbag 90 (i.e. in the holding section 56 of the retainer 55) via the insert opening 94, from the gas release section 42, and the bolt 45 of the body 41 is pushed into the dent 79 of the storing cove section 78 of the retainer 55 until it abuts against the left edge 80a of the peripheral region 80. At this time, the folded sealing regions 100A, 1008 and 100C formed among the retaining slits 96 and second auxiliary slits 98 are folded inward and disposed between the inflator body 41 and holding section 56 of the retainer 55 so as to cover the outer circumference 41c of the inflator body 41, as shown in FIG. 25. The support bodies 58b of the elastically deformable support regions 58 and the leading ends of the supporting projections 70 of the butt regions 69 hold the inflator body 41 from moving both in the axial direction and in a direction perpendicular to the axis, thus the holding section 56 provisionally supports the inflator body 41. Thereafter, the airbag 90 and the inflator 40 are stored in the case 28 such that the bolts 45 and 85 protrude out of the apertures 29a and 29b of the bottom wall 29, and the bolts 45 and 85 are fastened with the nuts 86. Thus the airbag 90 and inflator 40 are mounted on the bottom wall (i.e. vehicle body member) 29 of the case 28. At this time, due to fastening with the nuts 86, the edges 82b of the leading end region 82a of the pressing section 82 in the retainer 55 are deformed and a generally entire, continuous area of the leading end region 82a of the pressing section 82 is pressed onto the outer circumference 41c of the inflator body 41 (specifically, onto the outer circumference 41c of the front area of the inflator body 41 facing towards the bottom wall 57). The body 41 of the inflator 40 is thus prevented from slipping with respect to the retainer 55 by the bolt 45 and pressing section 82 located proximate to the bolt 45, and secured to the bottom wall 29 tightly.

Thereafter, the airbag cover 16 is assembled with the case 28 by having the hooks 32a and 33a engaged with peripheral areas of the retaining holes 21a and 22a, such that an airbag module is completed. This airbag module is mounted on the vehicle with the aid of the brackets 4. In the meantime, the connector 47 provided with a lead wire 48 leading to an airbag actuating circuit is connected with the connection port 43 of the inflator body 41 exposed from the through opening 35R of the case 28. If then the dashboard 12 and undercover 13 (FIGS. 1 and 2) are mounted, the airbag device S is mounted on the vehicle.

After the airbag device S is mounted on the vehicle, if an actuating signal is fed to the inflator body 41 via the lead wire 48, the inflator body 41 will emit an inflation gas out of the gas discharge ports 42a into the airbag 90 via the outlet openings 56b and 56c of the holding section 56 of the retainer 55. Then the airbag 90 will inflate and break the wrapping member, push the door 18 of the airbag cover 16, and the door 18 will open upward and downward about the hinges 20 along with rupture of the breakable region 19, such that the airbag body 91 will emerge out of the emergence opening 28a of the case 28 and deploy rearwardly as indicated by double-dotted lines in FIGS. 1 and 4.

With the configuration of the airbag device S of the illustrated embodiment, the inflator body 41 can be smoothly inserted into the holding section 56 of the retainer 55 due to elastic deformation of the elastically deformable support regions 58, at insertion of the inflator body 41 into the holding section 56. After the inflator body 41 has been inserted, the elastically deformable support regions 58 abut against the outer circumference 41c of the inflator body 41 in the elastically deformed state. Further, the holding section 56 includes the supporting projections 70 each of which has higher rigidity than the elastically deformable support region 58 and abuts against the outer circumference 41c of the inflator body 41. Accordingly, after the inflator body 41 has been once inserted into the holding section 56, the support bodies 58b of the elastically deformable support regions 58 and the leading ends of the supporting projections 70 of the butt regions 69 support the inflator body 41 adequately at desired positions inside the holding section 56.

Therefore, the airbag device S of the illustrated embodiment facilitates insertion of the inflator body 41 into the holding section 56 of the retainer 55 and assures adequate support of the inflator body 41 by the holding section 56 of the retainer 55.

In the airbag device S of the illustrated embodiment, the holding section 56 includes two elastically deformable support regions 58 (58L and 58R) and two butt regions 69 (69L and 69R, each including two supporting projections 70) each interspatially in the axial direction of the inflator 40 (or inflator body 41). Therefore, the holding section 56 stably supports the inflator body 41 without little fear that the central axis X1 of the inflator 40 can incline with respect to the central axis X2 of the holding section 56. If such an advantageous effect does not have to be considered, it is also conceivable to locate one each elastically deformable support region and butt region (with two supporting projection) interspatially in the axial direction of the inflator. Further alternatively, the holding section 56 may be configured with two of either one of the elastically deformable support region or the supporting projection, and one of the other.

In the airbag device S of the illustrated embodiment, moreover, one of the elastically deformable support regions 58 and a pair of the supporting projections 70 are arranged generally radially about the axis of the inflator 40 (or inflator body 41). This configuration helps match the axial center C1 of the inflator body 41 and the axial center of the holding section 56 (which generally equals to the center that the holding section 56 holds the inflator 40, or to the insertion center C2 of the insert opening 56d of the retainer 55), at insertion of the inflator body 41, and once the inflator body 41 is inserted, the elastically deformable support region 58 and the supporting projections 70 support the outer circumference 41c of the inflator body 41 in a balanced fashion in the circumferential direction. If such an advantageous effect does not have to be considered, it is also conceivable to locate one elastically deformable support region and one supporting projection at diametrically opposed positions.

Furthermore, in the airbag device S of the illustrated embodiment, each of the elastically deformable support regions 58L or 58R and the supporting projections 70 of each of the butt regions 69L or 69R are disposed generally at the same position in the axial direction of the inflator 40 (or inflator body 41). That is, the elastically deformable support region 58 and the supporting projections 70 support the outer circumference 41c of the inflator 40 (or inflator body 41) at three points around the axis of the inflator 40 at one position in the axial direction of the inflator 40. Thus the holding section 56 further stably holds the inflator body 41. If such an advantageous effect does not have to be considered, the elastically deformable support region and a pair of the supporting projections may be located at spaced-apart positions in the axial direction of the inflator.

Moreover, in the airbag device S of the illustrated embodiment, each of the elastically deformable support regions 58 is formed by cutting and raising a portion of the inner region 57b of the bottom wall 57 of the holding section 56. Therefore, the elastically deformable support region 58 can be formed at the same time as the manufacture of the retainer 55. This configuration also contributes to reduction of the number of parts and manufacturing cost of the airbag device S. The elastically deformable support region may be formed of an elastic member separate from the holding section if such an advantageous effect does not have to be considered. In the illustrated embodiment, when each of the elastically deformable support regions 58 is formed, the opening 61 is formed around the elastically deformable support region 58. However, these openings 61 are closed off by the cover regions 62 each of which is composed of the outer region 57a of the bottom wall 57, such that the inflation gas exiting the inflator 40 is prevented from flowing out of the retainer 55 via the vicinities of the elastically deformable support regions 58. This configuration will accordingly further prevent the inflation gas from contacting the vehicle body side wall 91a of the airbag 90 which is disposed between the bottom wall 57 of the holding section 56 of the retainer 55 and the bottom wall 29 of the case 28 (see FIGS. 2 and 3).

The airbag device S of the illustrated embodiment is configured such that the airbag 90 and inflator 40 are mounted on the bottom wall 29 of the case 28 through the use of the bolt 85 of the retainer 55 and bolt 45 of the inflator 40, and the bolt 45 of the inflator 40 is configured to be inserted into the storing cove section 78 of the retainer 55 so as to be consistent in protruding direction with the bolt 85 of the retainer 55 when the inflator body 41 is set in the holding section 56 of the retainer 55. The dent 79 of the storing cove section 78 for receiving the bolt 45 is formed into a mere indentation whose right end is left open as the opening 79a. However, with the configuration of the illustrated embodiment, once the inflator body 41 is put through the holding section 56 and positioned at a predetermined position (i.e. such that the bolt 45 abuts against the left edge 80a of the peripheral region 80 of the storing cove section 78), the elastically deformable support regions 58 and supporting projections 70 (or butt regions 69) provisionally hold the inflator body 41 from moving in the axial direction, and prevent the bolt 45 from moving inside the dent 79 as well. Thus the bolt 45 is easily positioned with respect to the bolt 85 of the retainer 55 without a fear of slipping. Therefore, despite the configuration that one bolt 45 out of the two is disposed on the inflator 40 while the other bolt 85 is disposed on the retainer 55, the protruding direction of and the distance between the bolts 45 and 85 will be uniform in generally all products, such that the bolts 45 and 85 will smoothly go into the apertures 29a and 29b of the bottom wall 29 of the case 28 at one time. The configuration of the illustrated embodiment thus will not hinder an ease of assembly.

Although the illustrated embodiment has been described as applied to the airbag device S for knee protection, application of the invention should not be limited thereby. The invention may also be applied to a side airbag device which is adapted to be mounted on a backrest of a seat of a vehicle, by way of example.

In the illustrated embodiment, each of the retainer 55 and inflator 40 is provided with a bolt 45/85 so as to be mounted on the bottom wall (vehicle body member) 29 of the case 28 with them. However, it is also conceivable to provide no bolt on the inflator but provide two bolts on the retainer to be used for mounting on a vehicle body member.

What is claimed is:

1. An airbag device adapted to be mounted on a vehicle, comprising:
    an airbag that is inflatable with an inflation gas:
    an inflator that feeds the airbag with the inflation gas, the inflator being generally cylindrical in outer contour; and
    a retainer that holds the inflator and mounts the airbag and the inflator on a vehicle body member, the retainer comprising:
        a holding section that is generally tubular in outer contour for receiving and holding the inflator therein;
        mounting means that protrudes out of the holding section in a direction generally perpendicular to an axis of the inflator and is adapted to be mounted on the vehicle body member in order to mount the airbag and the inflator on the vehicle body member;
        an elastically deformable support region that is disposed at an inner side of the holding section, the elastically deformable support region being configured to elastically deform and be brought into abutment against an outer circumference of the inflator when the inflator is inserted into the holding section, and the elastically deformable support region supports the inflator in the elastically deformed state at the inner side of the holding section; and
        a supporting projection that is disposed at the inner side of the holding section for supporting the inflator, the supporting projection having higher rigidity than the elastically deformable support region and being configured to abut against the outer circumference of the inflator at the inner side of the holding section;
    wherein the elastically deformable support region is formed into a band, the elastically deformable support region having a leading end and a root end, the leading end is separated from the holding section, and the root end is connected to the holding section,
    wherein at least either the elastically deformable support region or the supporting projection is disposed at two spaced-apart positions in an axial direction of the inflator,
    wherein the elastically deformable support region and the supporting projection are disposed at three generally radial positions in total about the axis of the inflator, and
    wherein the elastically deformable support region and the supporting projection are disposed generally at the same position in the axial direction of the inflator.

2. The airbag device of claim 1, wherein each of the elastically deformable support region and the supporting projection is disposed at two spaced-apart positions in an axial direction of the inflator.

3. The airbag device of claim 1, wherein:
    the holding section is formed of a sheet metal; and
    the elastically deformable support region is formed by cutting and raising a portion of the holding section.

4. The airbag device of claim 3, wherein:
    the elastically deformable support region is formed by cutting and raising a portion of the holding section such that an opening is formed in a periphery of the elastically deformable support region on the holding section; and
    the opening in the periphery of the elastically deformable support region is closed.

5. An airbag device adapted to be mounted on a vehicle, comprising:
    an airbag that is inflatable with an inflation gas:
    an inflator that feeds the airbag with the inflation gas, the inflator being generally cylindrical in outer contour; and
    a retainer that holds the inflator and mounts the airbag and the inflator on a vehicle body member, the retainer comprising:
        a holding section that is generally tubular in outer contour for receiving and holding the inflator therein;
        mounting means that protrudes out of the holding section in a direction generally perpendicular to an axis of the inflator and is adapted to be mounted on the vehicle body member in order to mount the airbag and the inflator on the vehicle body member;
        an elastically deformable support region that is disposed at an inner side of the holding section, the elastically deformable support region being configured to elastically deform and be brought into abutment against an outer circumference of the inflator when the inflator is inserted into the holding section, and the elastically deformable support region supports the inflator in the elastically deformed state at the inner side of the holding section; and
        a supporting projection that is disposed at the inner side of the holding section for supporting the inflator, the supporting projection having higher rigidity than the elastically deformable support region and being configured to abut against the outer circumference of the inflator at the inner side of the holding section;

wherein the elastically deformable support region is formed into a band, the elastically deformable support region having a leading end and a root end, the leading end is separated from the holding section, and the root end is connected to the holding section, wherein:

the elastically deformable support region extends generally along the axis of the inflator;

the root end is arranged adjacent to an insert opening of the holding section;

the elastically deformable support region includes (i) a sloping region, including the root region, (ii) the leading end region, (iii) and a support body which is disposed between the sloping region and the leading end region, which is curved generally in an arcuate shape and which protrudes inwardly; and the elastically deformable region is configured to bend at the sloping region and to abut the support body against the outer circumference of the inflator when the inflator is inserted into the holding section.

6. The airbag device of claim 5, wherein at least either the elastically deformable support region or the supporting projection is disposed at two spaced-apart positions in an axial direction of the inflator.

7. The airbag device of claim 6, wherein the elastically deformable support region and the supporting projection are disposed at three generally radial positions in total about the axis of the inflator.

8. The airbag device of claim 7, wherein the elastically deformable support region and the supporting projection are disposed generally at the same position in the axial direction of the inflator.

9. The airbag device of claim 5, wherein each of the elastically deformable support region and the supporting projection is disposed at two spaced-apart positions in an axial direction of the inflator.

10. The airbag device of claim 5, wherein:

the holding section is formed of a sheet metal; and the elastically deformable support region is formed by cutting and raising a portion of the holding section.

11. The airbag device of claim 10, wherein:

the elastically deformable support region is formed by cutting and raising a portion of the holding section such that an opening is formed in a periphery of the elastically deformable support region on the holding section; and the opening in the periphery of the elastically deformable support region is closed.

* * * * *